US011228641B1

(12) United States Patent
Wagner et al.

(10) Patent No.: US 11,228,641 B1
(45) Date of Patent: Jan. 18, 2022

(54) INTER-METRO CONNECTIVITY NETWORK CONNECT

(71) Applicant: Equinix, Inc., Redwood City, CA (US)

(72) Inventors: Theodore James Wagner, Arvada, CO (US); Guido Franciscus Wilhelmus Coenders, Valkenswaard (NL); Micah Bartell, Leander, TX (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 16/947,614

(22) Filed: Aug. 10, 2020

Related U.S. Application Data

(62) Division of application No. 15/475,957, filed on Mar. 31, 2017, now Pat. No. 10,742,721.

(60) Provisional application No. 62/317,281, filed on Apr. 1, 2016.

(51) Int. Cl.
*H04L 29/08* (2006.01)
*H04L 12/46* (2006.01)

(52) U.S. Cl.
CPC .......... *H04L 67/10* (2013.01); *H04L 12/4641* (2013.01); *H04L 67/16* (2013.01); *H04L 69/325* (2013.01)

(58) Field of Classification Search
CPC ... H04L 69/325; H04L 67/16; H04L 12/4641; H04L 67/10; H04L 67/1012
See application file for complete search history.

(56) References Cited

U.S. PATENT DOCUMENTS

| 10,742,721 | B1 | 8/2020 | Wagner et al. | |
|---|---|---|---|---|
| 2015/0112931 | A1* | 4/2015 | Bourbonnais | G06F 16/27 707/626 |
| 2015/0280980 | A1* | 10/2015 | Bitar | H04L 67/34 709/226 |
| 2015/0281046 | A1 | 10/2015 | Bitar | |
| 2015/0326467 | A1* | 11/2015 | Fullbright | H04L 45/64 709/242 |

(Continued)

OTHER PUBLICATIONS

Rosen et al., "BGP/MPLS IP Virtual Private Networks (VPNs)," RFC 4364, Network Working Group, Feb. 2006, 47 pp.

(Continued)

*Primary Examiner* — Oleg Survillo
*Assistant Examiner* — Christopher P Cadorna
(74) *Attorney, Agent, or Firm* — Shumaker & Sieffert, P.A.

(57) ABSTRACT

In general, techniques are described for dynamically programming a cloud-based service exchange to enable connections from an enterprise buyer in one metropolitan area to connect to a cloud exchange in another metropolitan area. For example, a network data center includes a programmable network platform to receive an indication of a network service provider (NSP) configured to transport traffic to a customer in a second metropolitan area; provision a virtual circuit from a customer-facing port of a cloud-based services exchange point of the second metropolitan area to the NSP; receive a service request that specifies one or more cloud services provided by one or more cloud service provider networks of the first metropolitan area operated by the respective cloud service providers; and configure access to the one or more cloud services provided by one or more cloud service provider networks via the virtual circuit.

12 Claims, 15 Drawing Sheets

(56) References Cited

U.S. PATENT DOCUMENTS

| | | | |
|---|---|---|---|
| 2016/0080501 A1* | 3/2016 | Freimuth | H04L 63/20 |
| | | | 709/228 |
| 2016/0105489 A1* | 4/2016 | Llorca | G06F 9/50 |
| | | | 709/226 |
| 2016/0127254 A1 | 5/2016 | Kumar et al. | |
| 2016/0127454 A1 | 5/2016 | Maheshwari et al. | |
| 2016/0191341 A1* | 6/2016 | Sivasankaran | H04L 41/5051 |
| | | | 709/220 |
| 2016/0308762 A1 | 10/2016 | Teng et al. | |
| 2016/0337473 A1 | 11/2016 | Rao | |
| 2017/0063614 A1 | 3/2017 | Hartwig | |
| 2017/0093702 A1 | 3/2017 | Teng et al. | |
| 2017/0111220 A1 | 4/2017 | Kumar et al. | |

OTHER PUBLICATIONS

Prosecution History from U.S. Appl. No. 15/475,957, dated Oct. 22, 2019 through Apr. 6, 2020, 37 pp.

\* cited by examiner

INTER-METRO CONNECTIVITY NETWORK CONNECT

This application is a divisional application of U.S. application Ser. No. 15/475,957 filed Mar. 31, 2017, which claims the benefit of U.S. Provisional Application No. 62/317,281, filed Apr. 1, 2016, the entire content of each of which is incorporated by reference herein.

TECHNICAL FIELD

The invention relates to computer networks and, more specifically, to facilitating service provisioning and delivery among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes an interconnection system in which a programmable network platform dynamically programs multiple geographically-distributed cloud-based service exchanges ("cloud exchanges") to provision an interconnection between (e.g., enterprise and/or cloud service provider) networks co-located at the multiple cloud exchanges and deployed by customers of the cloud exchange provider. In some cases, the multiple cloud exchanges may be geographically located in different metropolitan areas.

For example, multiple network service providers (NSPs, or "carriers") may co-locate at the multiple cloud exchanges to provide network connectivity for other co-located customers and, more particularly, network connectivity between the cloud exchanges. The cloud exchange provider that deploys the cloud exchanges may present an interface that outputs characteristics of the multiple NSP networks' network connectivity characteristics, such as bandwidth, service-level agreements, quality, performance, and price. The interface may enable a customer to input an indication of a selected NSP offering from the multiple NSP network connectivity offerings. In some examples, network connectivity may include cloud connectivity for the customer to a cloud service provider co-located in a cloud exchange at which the customer network for the customer is not co-located. In some examples, the NSP network may include a network or network connection managed by the cloud exchange provider.

Based on the indication of the selected NSP offering, the programmable network platform described herein provisions at least one interconnection between the customer network at a first one of the multiple cloud exchanges and a customer network or cloud service provider network at a second one of the multiple cloud exchanges, where the at least one interconnection includes a transport link across the network of the selected NSP between a port for the NSP at the first cloud exchange and a port of the NSP at the second cloud exchange. The programmable network platform may, in this way, orchestrate a business-level service between networks co-located at cloud exchanges located in different metros according to well-defined service policies, quality of service, service level agreements, latency, costs, existing relationship, and further according to a service topology for the business-level service.

For example, the programmable network platform enables the cloud exchange provider that administers the cloud exchanges to dynamically configure and manage the cloud exchanges to, for instance, facilitate virtual connections with respective NSPs, for cloud services delivery from multiple cloud service providers in one metro to one or more cloud customers of another metro. The cloud exchanges with inter-metro connectivity provided by selected NSPs may enable cloud customers to bypass the public Internet to directly connect to cloud service providers of a different metro so as to eliminate the need for the customer to establish inter-metro connectivity by negotiating and contracting services directly with the NSPs and connecting via respective physical cross connects in the cloud exchanges. That is, the cloud exchanges with inter-metro connectivity may improve performance, reduce costs, increase the security and privacy of the connections, provide pre-provisioned capacity of respective NSPs from different metros and leverage cloud computing for additional applications. In this way, enterprises, network carriers, and SaaS customers, for instance, can at least in some aspects integrate cloud services with their internal applications across a plurality of different metro-based networks as if such services are part of or otherwise directly coupled to their own data center network. As such, providing inter-metro connectivity via the cloud exchange may provide simplification and automation of cloud and interconnection services available to enterprise customers.

In one example, a method may include receiving, by a programmable network platform for a cloud-based services exchange point of a first metropolitan area, an indication of a network service provider (NSP) configured to transport traffic to a customer in a second metropolitan area. The method may also include provisioning, by the programmable network platform, a virtual circuit from a customer-facing port of a cloud-based services exchange point of the second metropolitan area to the NSP. The method may also include receiving, by the programmable network platform and from the customer, a service request that specifies one or more cloud services provided by one or more cloud service provider networks of the first metropolitan area operated by the respective cloud service providers. The method may also include configuring, by the programmable network platform and for the customer, access to the one or more cloud services provided by one or more cloud service provider networks via the virtual circuit.

In another example, a method may include receiving, by a customer and from a programmable network platform for a cloud based services exchange point of a first metropolitan area, one or more selectable options to connect to one or more network service providers (NSPs) configured to transport traffic from one or more cloud services provided by one or more cloud service provider networks of a second metropolitan area. The method may also include selecting, by the customer and from the programmable network platform, the one or more NSPs to connect the customer to the one or more cloud service provider networks.

In another example, an interconnection system may include a cloud-based services exchange point of a first metropolitan area comprising a network, wherein the cloud-based services exchange point is operated by a cloud exchange provider that operates the network data center. The interconnection system may also include a programmable network platform comprising at least one programmable processor configured to: receive, for a cloud-based services exchange point of a first metropolitan area, an indication of a network service provider (NSP) configured to transport traffic to a customer in a second metropolitan area; provision a virtual circuit from a customer-facing port of a cloud-based services exchange point of the second metropolitan area to the NSP; receive, from the customer, a service request that specifies one or more cloud services provided by one or more cloud service provider networks of the first metropolitan area operated by the respective cloud service providers; and configure, for the customer, access to the one or more cloud services provided by one or more cloud service provider networks via the virtual circuit.

In another example, a method may include receiving, by a programmable network platform for a first cloud exchange located in a first metropolitan area, a service request comprising an indication of a network service provider (NSP) network for transporting network traffic between the first cloud exchange and a second cloud exchange located in a second metropolitan area, the network traffic associated with a customer of a cloud exchange provider for the first cloud exchange and the second cloud exchange. The method may also include provisioning, by the programmable network platform in response to the service request, a virtual circuit of the first cloud exchange to interconnect a first network directly coupled to a first port of the first cloud exchange and the NSP network directly coupled to a second port of the first cloud exchange. The method may also include provisioning, by the programmable network platform, a virtual circuit of the second cloud exchange to interconnect a second network directly coupled to a first port of the second cloud exchange and the NSP network directly coupled to a second port of the first cloud exchange.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

In general, this disclosure describes an interconnection system with a programmable network platform for dynamic configuration and management of cloud-based services exchange ("cloud exchange") to facilitate inter-connectivity among cloud exchanges, e.g., in different metropolitan areas ("metros"). As described herein, the interconnection system provides customers of the exchange, e.g., enterprises, network carriers, and SaaS customers, with secure, private, virtual connections to multiple cloud service providers (CSPs) or between multiple customer networks globally across different metros. The multiple CSPs participate in the cloud exchange by virtue of their having at least one accessible port in the cloud exchange by which a customer of one metro can connect to the one or more cloud services offered by the CSPs of a different metro, respectively, via a connection between one of partner network service providers 106A, 106B (collectively, "NSPs 106") and a cloud exchange of a different metro.

According to various examples described herein, a cloud exchange is described that allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers of a different metro.

Figure 1:
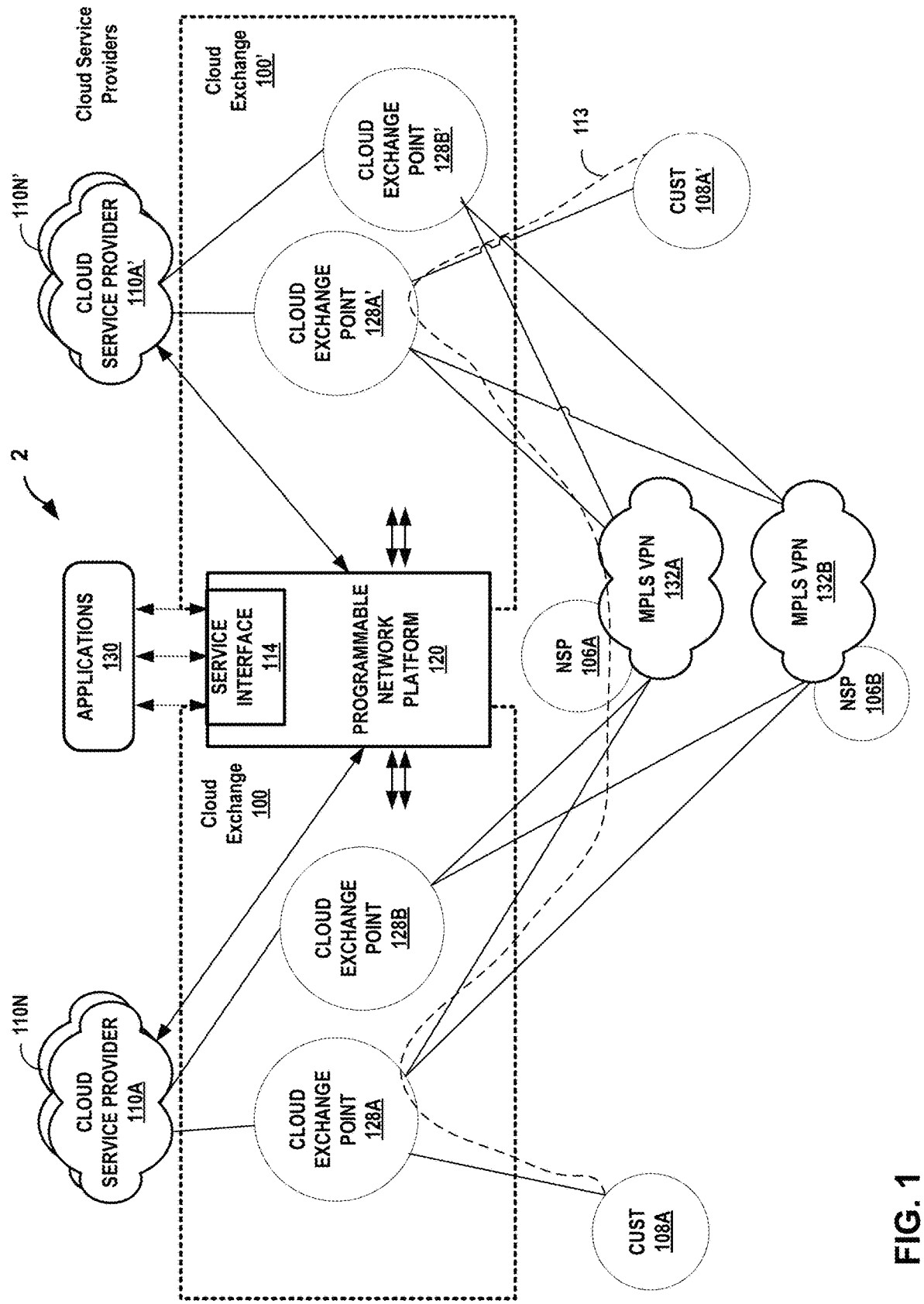
FIG. 1 illustrates a conceptual view of a network system having an inter-connecting metro-based cloud exchange that provides multiple cloud exchange points across different metropolitan areas according to techniques described herein.

FIG. 1 illustrates a conceptual view of an interconnection system 2 having an inter-connecting metro-based cloud exchanges that provide one or more cloud exchange points across different metropolitan areas according to techniques described herein. Cloud-based services exchange points 128A-128B (described hereinafter as "cloud exchange points" and collectively referred to as "cloud exchange points 128") and 128A'-128B' (collectively, "cloud exchange points 128'") of cloud-based services exchanges 100, 100' (collectively, "cloud exchanges 100"), respectively, may represent different data centers geographically located within different metropolitan areas ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") of one metro and cloud-based service providers ("cloud providers") of a different metro connect to receive and provide, respectively, cloud services. In various examples, cloud exchanges 100 may include more or fewer cloud exchange points 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchanges 100 having one or more cloud exchange points 128.

Each of cloud exchange points 128 includes network infrastructure and an operating environment by which cloud customers 108A, 108A' (collectively, "cloud customers 108") receive cloud services from cloud service providers 110A-110N (collectively, "CSPs 110") and 110A'-110N' (collectively, "CSPs 110"), respectively. For example, cloud customer 108A may also receive cloud-based services directly via a layer 3 peering and physical connection to one of cloud exchange points 128 or indirectly via network service provider 106 (or alternatively, "carrier 106"). Similarly, cloud customers 108A' may receive cloud-based services directly via a layer 3 peering and physical connection to one of cloud exchange points 128' or indirectly via NSP 106B. NSPs 106A, 106B may also provide "cloud transit" to the cloud services of corresponding metros by maintaining a physical presence within one or more of cloud exchange points and aggregating layer 3 access from one or more customers. In some examples, an NSP may provide a cloud transit to cloud services of a different metro by maintaining a physical presence within one or more cloud exchange points of a cloud exchange of the different metro. For example, each of NSPs 106 may peer, at layer 3 e.g., multiprotocol label switching virtual private networks (MPLS VPNs) 132A, 132B, respectively, directly with one or more cloud exchange points 128, 128', and in so doing offer indirect layer 3 connectivity and peering to one or more customers 108 by which customers 108 of one metro may obtain cloud services from a cloud exchange of a different metro.

Each of cloud exchange points 128', in the example of FIG. 1, is assigned a different autonomous system number (ASN). For example, cloud exchange point 128A' is assigned ASN 1, cloud exchange point 128B' is assigned ASN 2, and so forth. Each cloud exchange point 128' is thus a next hop in a path vector routing protocol (e.g., BGP) path from cloud service providers 110' to customers 108'. Moreover, by utilizing "partner" NSPs coupled to different metros, each cloud exchange point 128 may be a next hop across the different metropolitan areas in a path vector routing protocol path from cloud service providers 110' of one metro to customers 108 of a different metro. As a result, each cloud exchange point 128 may, despite not being a transit network having one or more wide area network links and concomitant Internet access and transit policies, peer with multiple different autonomous systems via external BGP (eBGP) or other exterior gateway routing protocol, including network service providers with access to customers of a different metro, in order to exchange, aggregate, and route service traffic from one or more cloud service providers 110 of one metro to the customers of the different metro. In other words, cloud exchange points 128' may internalize the eBGP peering relationships and NSP relationships that cloud service providers 110' and customers 108 would maintain on a pair-wise basis. In this way, a customer 108 may configure a single eBGP peering relationship and NSP relationship with a cloud exchange point 128' and receive, via cloud exchange 100' of a different metro, multiple cloud services from one or more cloud service providers 110'. While described herein primarily with respect to eBGP or other layer 3 routing protocol peering between cloud exchange points and customer, NSP, or cloud service provider networks, the cloud exchange points may learn routes from these networks in other ways, such as by static configuration, or via Routing Information Protocol (RIP), Open Shortest Path First (OSPF), Intermediate System-to-Intermediate System (IS-IS), or other route distribution protocol.

As examples of the above, customer 108A is illustrated as having contracted with a cloud exchange provider for cloud exchange 100 to directly access layer 3 cloud services from cloud service provider 110A' via cloud exchange point 128A. Customer 108A is illustrated as having contracted with partner NSP 106A coupled to the MPLS VPN 132A network. For example, customer 108A (e.g., located in Dallas) is illustrated as having contracted with NSP 106A to access layer 3 cloud services of a different metropolitan area (e.g., of Chicago) via a transit network through NSP 106A. In some examples, customer 108A may also contract with NSP 106B to access cloud services of the different metropolitan area network. In this way, customer 108A receives an end-to end connection with redundant layer 3 connectivity to cloud service provider 110A', for instance.

The contracts described above are instantiated in network infrastructure of the cloud exchange points 128' by L3 peering configurations within switching device NSP 106A or NSP 106B and cloud exchange points 128' and L3 connections, e.g., layer 3 virtual circuits, established within cloud exchange points 128' to interconnect cloud service provider 110' networks of a different metro to NSP 106A or NSP 106B and customer 108A network, all having at least one port offering connectivity within one or more of the cloud exchange points 128'.

In some examples, cloud exchanges 100 allow customer 108A to be directly inter-connected to customer 108A', via a virtual layer 2 (L2) or layer 3 (L3) connection through a connection with partner network service provider, e.g., NSP 106A or NSP 106B. In this way, customer 108A of one metropolitan area may receive an end-to-end connection 113 with L2 or L3 connectivity to customer 108A' of a different metropolitan area.

Partner NSPs, e.g., NSPs 106A, 106B, may represent a respective network service provider that is associated with a transit network of a corresponding metropolitan area by which network subscribers of the partner NSP 106 may access customer network 108A' or cloud services offered by CSPs 110A' via the cloud exchange 100'. In general, customers of cloud service providers may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by CSPs 110, 110' via the cloud exchanges 100.

In this way, cloud exchanges 100 streamline and simplify the process of partnering CSPs 110' of one metropolitan area and customers 108 of a different metropolitan area, and/or partnering customers 108, 108' via partner NSPs 106 in a transparent and neutral manner. In one example, each of the cloud exchanges 100 is a co-location and interconnection data center in which CSPs, NSPs and/or customers may already have network presence, such as by having one or more accessible ports available for interconnection between the data centers and respective network service providers, which may represent any of cloud exchange points 128, 128' from corresponding cloud exchanges 100. This allows the participating NSPs, customers, and CSPs to have a wide range of interconnectivity options within separate facilities of different metropolitan areas. In this way, a carrier/customer may have options to create many-to-many interconnections with only a one-time hook up to one or more cloud exchange points 128' via any one of partner NSPs 106 without the customer's need to negotiate and contract services directly with the respective network service providers and to connect via physical cross connect in each corresponding metropolitan area. In other words, instead of a customer having to establish separate connections across transit networks to access cloud service providers of a different metro, cloud exchanges 100 allow customers to interconnect to multiple CSPs and cloud services of the different metro through the connection of pre-provisioned NSPs.

In accordance with techniques described herein, interconnection system 2 includes a programmable network platform 120 for dynamically programming each of cloud exchanges 100 to responsively and assuredly fulfill service requests that encapsulate business requirements for services provided by cloud exchanges 100 and/or cloud service providers 110, 110' across different metropolitan areas. The programmable network platform 120 as described herein may, as a result, orchestrate a business-level service across heterogeneous cloud service providers 110, 110' of different metropolitan areas (e.g., Dallas and Chicago) according to well-defined service policies, quality of service policies, service level agreements, performance, benchmarking, existing relationship, and costs, and further according to a service topology for the business-level service.

Programmable network platform 120 enables the cloud service provider that administers the cloud exchanges 100 to dynamically configure and manage the cloud exchanges 100 to, for instance, facilitate virtual connections with partner NSPs (e.g., NSPs 106A, 106B) for cloud-based services delivery from networks located in one metro to one or more networks located in another metro. For example, cloud exchanges 100 may enable cloud customers 108 that are not physically connected cloud services providers 110' of a different metro to access the cloud service providers 110' so as to improve performance, reduce connectivity time, increase assurance of the connections across the metro areas, and leverage cloud computing for additional applications across metros. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the cloud exchanges 100 or alternatively, off-site at a back office or branch of the cloud provider, for instance. Programmable network platform 120 may be distributed in whole or in part among the data centers, each data center associated with a different cloud exchange point 128, 128' to make up the cloud exchanges 100. As illustrated in FIG. 1, programmable network platform 120 may control service provisioning for multiple different cloud exchanges via respective partner NSPs. Alternatively or additionally, multiple separate instances of the programmable network platform 120 may control service provisioning for respective cloud exchanges.

In the illustrated example, programmable network platform 120 includes a service interface (or "service API") 114 that defines the methods, fields, and/or other software primitives by which applications 130 may invoke the programmable network platform 120. The service interface 114 may allow NSPs 106A, 106B, customers 108, 108', cloud service providers 110, 110', and/or the cloud exchange provider programmable access to capabilities and assets of the respective cloud exchanges 100.

Applications 130 may include a customer portal that presents NSP inter-metro network connectivity offerings. The customer portal may display, to a customer, a selectable list of NSPs that describes characteristics of inter-metro network connectivity via the NSP network. Such characteristics may include bandwidth, service-level agreements, quality, performance, and price for each network connectivity offering. The customer portal may enable a customer to input an indication of a selected NSP offering from the list of NSP network connectivity offerings. In response to the indication, the customer portal may send, via service interface 114, an indication of the selected NSP offering in a request for an interconnection between a customer network port in a cloud exchange 128A and a customer or cloud service provider network port in a cloud exchange 128A'. In response to the request, programmable network platform 120 may create virtual connections between the customer network port in cloud exchange 128A and a port of the selected NSP network in cloud exchange 128A as well as between the customer/cloud service provider network port in cloud exchange 128A' and a port of the selected NSP network in cloud exchange 128A'. The selected NSP network transports data between respective ports of the selected NSP network in cloud exchanges 128A, 128A' to facilitate the end-to-end connection 113.

For example, and as further described herein, the service interface 114 may facilitate machine-to-machine communication to enable dynamic provisioning of virtual circuits in the cloud exchange for interconnecting customer and cloud service provider networks of different metros via partner NSPs, e.g., NSP 106A, 106B. In this way, the programmable network platform 120 enables the automation of aspects of cloud services provisioning for different metropolitan areas. For example, the service interface 114 may provide an automated and seamless way for customers to establish, de-install and manage interconnection with partner NSPs to connect to multiple, different cloud providers of a different metropolitan area participating in the cloud exchange.

Further example details of cloud-based services exchanges can be found in U.S. Provisional Patent Application 62/149,374, filed Apr. 17, 2015 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" AND U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 2:
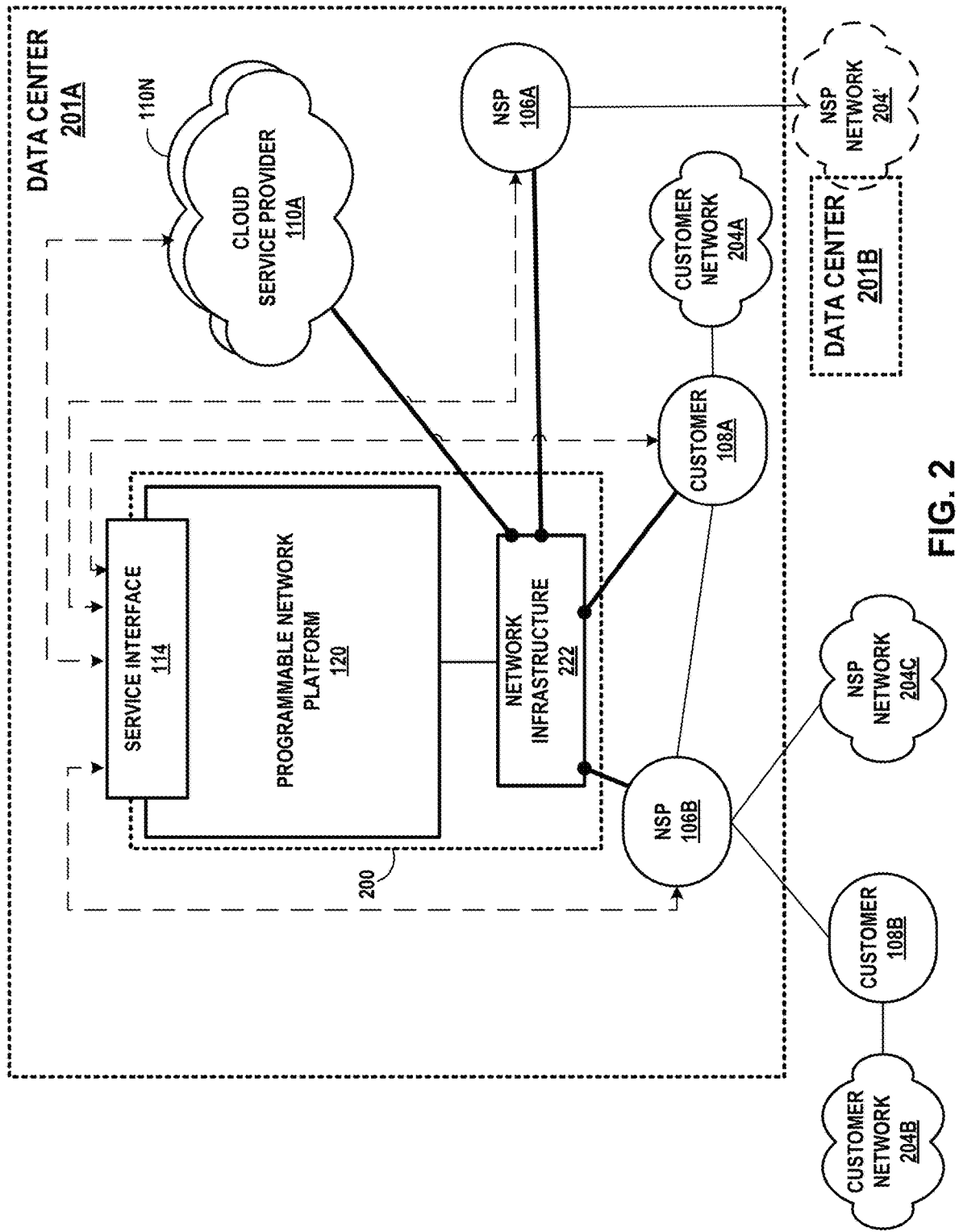
FIG. 2 is a block diagram illustrating a high-level view of a data center that provides an operating environment for a cloud-based services exchange, according to techniques described herein.

FIG. 2 is a block diagram illustrating a high-level view of a data center 201A that provides an operating environment for a cloud-based services exchange 200, according to techniques described herein. Cloud-based services exchange 200 may be an example of a cloud-based services exchange 100 of FIG. 1. Cloud-based services exchange 200 ("cloud exchange 200") allows a corresponding one of customer networks 204A, 204B, and NSP network 204C (collectively, "'private' or 'carrier' networks 204"), or other cloud customers including customers 108A, 108B to be directly inter-connected to any other customer network and/or to any of cloud service providers of data center 201B (which may also be illustrated similarly as data center 201A) located in another metropolitan area via partner NSP 106A and NSP network 204'. Connecting in this way allows the exchange of cloud service traffic among the customer networks of one metro and cloud service providers of a different metro, all of which is provided by cloud exchange 200.

Data center 201A may be entirely located within a centralized area, such as a warehouse or localized data center complex of a corresponding metropolitan area (e.g., Dallas), and provide power, cabling, security, and other services to NSPs, customers, and cloud service providers that locate their respective networks within data center 201A (e.g., for co-location) and/or connect to data center 201B by one or more external links via NSP 106A.

NSP 106A may represent a network service provider that is associated with a transit network by which network subscribers of NSP 106A may access cloud services offered by CSPs 110 via the cloud exchange 200. In accordance to the techniques of this disclosure, partner NSP 106A may represent a network service provider that is associated with a transit network by which network subscribers of NSP 106A (e.g., customers 108) may access cloud services offered by CSPs of a different metropolitan area via cloud exchange 200. In this way, cloud exchange 200 streamlines and simplifies the process of partnering CSPs of one metro and customers of a different metro in a transparent and neutral manner.

One example application of cloud exchange 200 is a co-location and interconnection data center 201A in which CSPs, NSPs, and/or customers of data center 201A may already have network presence, such as by having one or more accessible ports available for interconnection within data center 201A. In some examples, partner NSPs may also have one or more accessible ports available for interconnection within data center 201A. This allows the participating carriers, customers, and CSPs to have a wide range of interconnectivity options in separate facilities via partner NSP 106A. Cloud exchange 200 of data center 201A includes network infrastructure 222 that provides a L2/L3 switching fabric by which CSPs 110 and customers/NSPs interconnect. In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with NSP 106A, customers 108, and CSPs 110. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of another metro, cloud exchange 200 allows customers to interconnect to multiple CSPs and cloud services of the different metro using network infrastructure 222 within data center 201A, which may represent any of the edge networks described in this disclosure, at least in part.

By being connected to and utilizing cloud exchange 200, customers 108 can purchase services and reach out to many end users in many different geographical areas of different metropolitan areas without incurring the same expenses typically associated with installing and maintaining multiple virtual connections with multiple CSPs 110 across various NSPs. For example, any of customers 108 can expand its services using NSP 106A. By connecting to cloud exchange 200, NSP 106A may be able to generate additional revenue by offering to sell its network services to the other carriers through cloud exchange 200.

Cloud exchange 200 includes a programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSP 106A and customers 108 programmable access to capabilities and assets of the cloud exchange 200 corresponding to data center 201B of a different metropolitan area. The programmable network platform 120 may alternatively be referred to as a controller, provisioning platform, provisioning system, service orchestration system, etc., for establishing end-to-end services including, e.g., connectivity between customers of one metro-based network and cloud service providers of a different metro-based network via partner NSPs according to techniques described herein.

On the buyer side, the software interfaces presented by the underlying interconnect platform provide an extensible framework that allows software developers associated with the customers of cloud exchange 200 to create software applications that allow and leverage access to the programmable network platform 120 by which the applications may request that the cloud exchange 200 establish connectivity between the customer of one metro and cloud services offered by CSPs provided by data center 201B of a different metro. For example, these buyer-side software interfaces may allow customer applications for NSPs and enterprise customers, e.g., to obtain authorization to access the cloud exchange of a different metropolitan area coupled to partner NSPs, obtain information regarding available cloud services, obtain active ports and metro area details for the customer, create virtual circuits of varying bandwidth to access cloud services via partner NSPs, including dynamic selection of bandwidth based on a purchased cloud service to create on-demand and need based virtual circuits to cloud service providers via the partner NSPs, delete virtual circuits to the partner NSPs, obtain active virtual circuit information to the partner NSPs, obtain details surrounding CSPs partnered with the cloud exchange provider of the different metropolitan area, obtain customized analytics data, validate partner access to interconnection assets, and assure service delivery.

On the cloud service provider (seller) side, the software interfaces may allow software developers associated with cloud providers to manage their cloud services and to enable customers of another metro to connect to their cloud services via respective partner NSPs. For example, these seller-side software interfaces may allow cloud service provider applications to obtain authorization to access the cloud exchange via the partner NSPs, obtain information regarding available cloud services connected to the partner NSPs, obtain active ports and metro area details for the provider, obtain active port details in a given data center of the different metro for the provider, approve or reject virtual circuits of varying bandwidth created by customers for the purpose of accessing cloud services from the different metro, obtain virtual circuits pending addition and confirm addition of virtual circuits, obtain virtual circuits pending deletion and confirm deletion of virtual circuits, obtain customized analytics data, validate partner access to interconnection assets, and assure service delivery.

As further described herein, service interface 114 facilitates machine-to-machine communication to enable dynamic service provisioning of virtual circuits in the cloud exchange for interconnecting a customer and cloud service provider networks of different metros. In this way, the programmable network platform 120 enables the automation of aspects of cloud services provisioning for inter-metro connectivity. For example, the software interfaces may provide an automated and seamless way for customers to establish, de-install and manage interconnection with multiple, different cloud providers via partner NSPs participating in the cloud exchange. The programmable network platform 120 may in various examples execute on one or more virtual machines and/or real servers of data center 201A, or off-site.

Figure 3A:
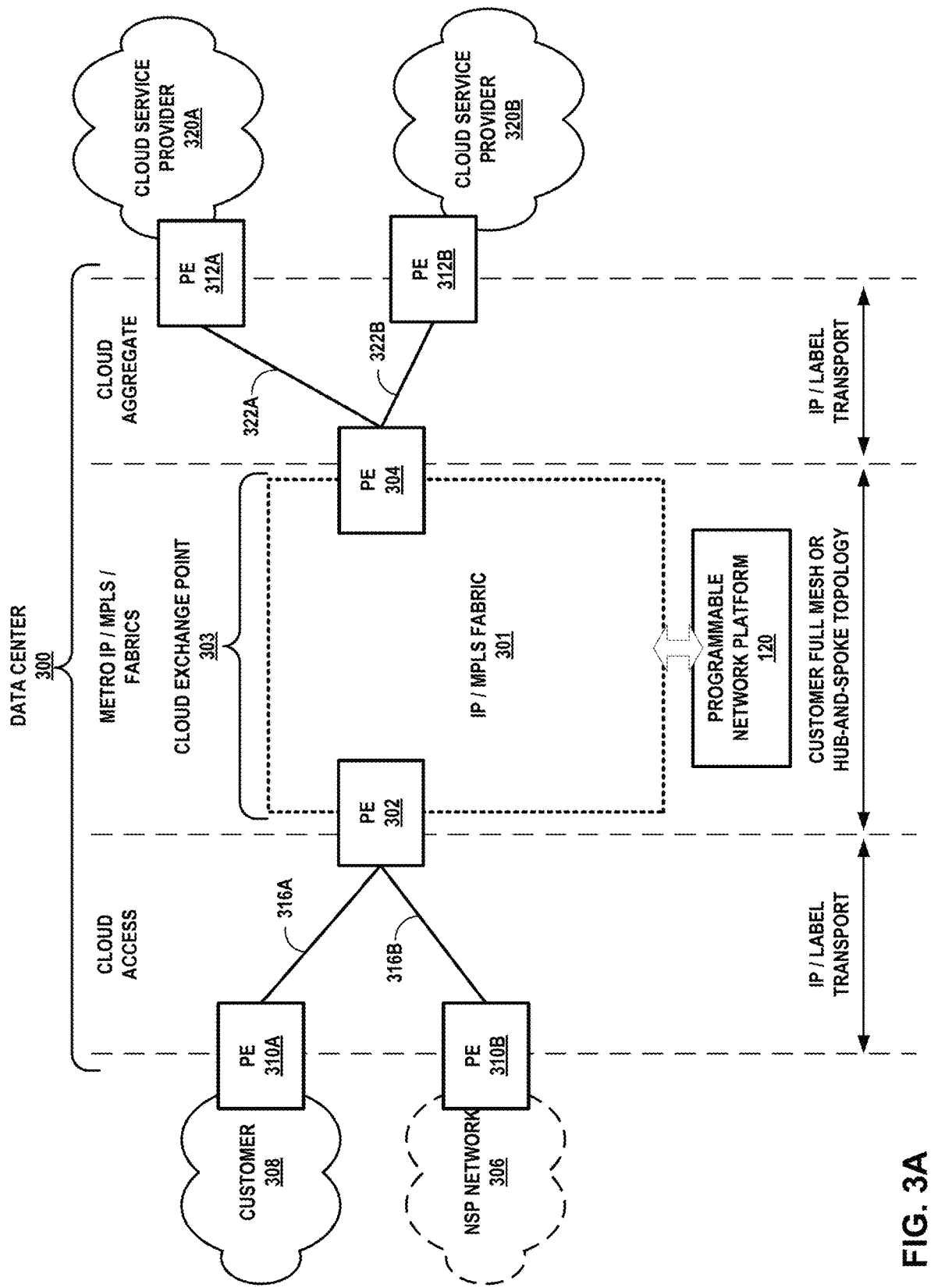
FIGS. 3A-3B are block diagrams illustrating example network infrastructure and service provisioning by a programmable network platform for a cloud exchange that aggregates the cloud services of multiple cloud service providers of different metropolitan areas ("metros") for provisioning to customers of the cloud exchange provider and aggregates access for multiple customers to one or more cloud service providers via partner network service providers, in accordance with techniques described in this disclosure.
Figure 3B:
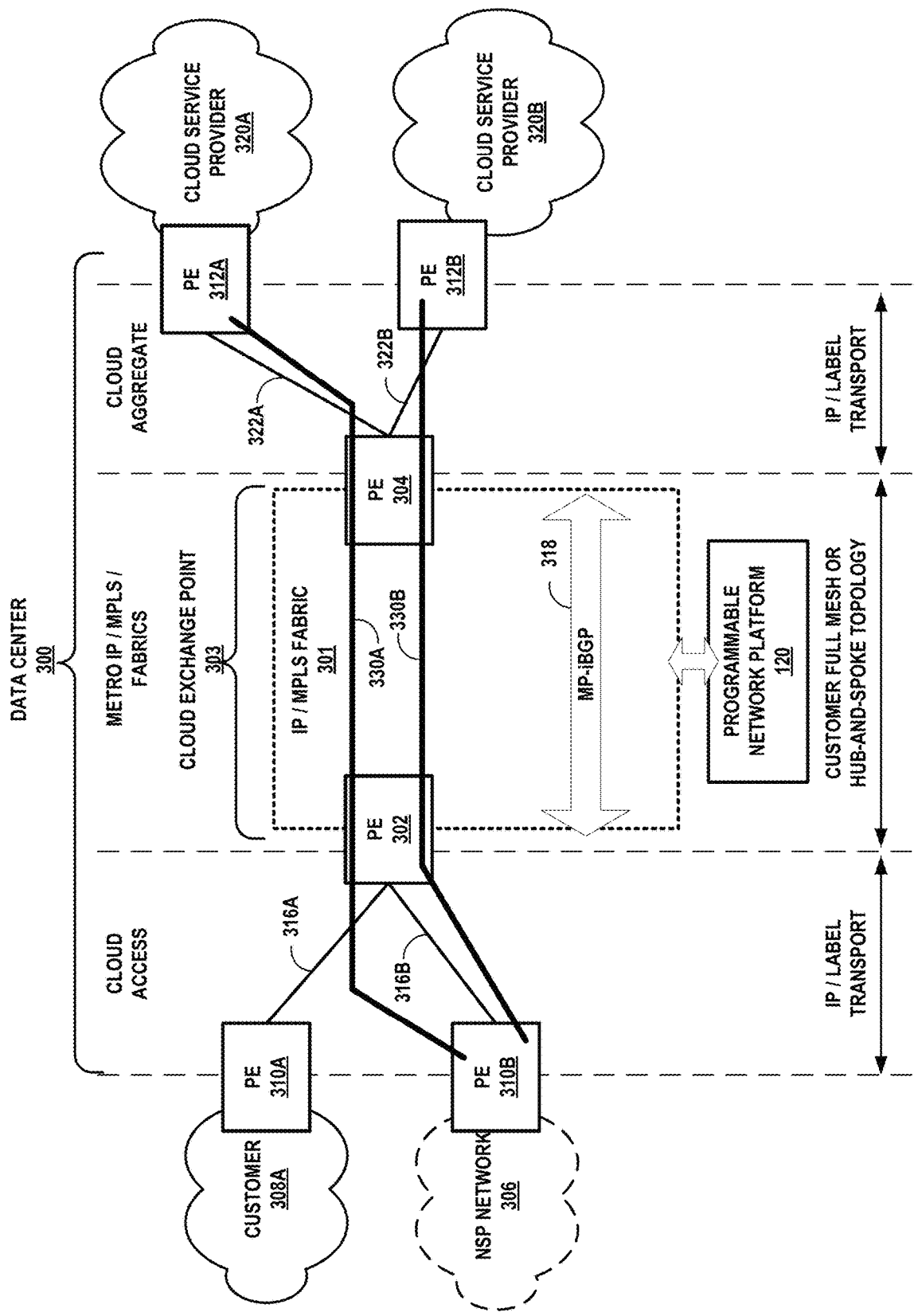

FIGS. 3A-3B are block diagrams illustrating examples of network infrastructure and service provisioning by a programmable network platform for a cloud exchange that provides access to cloud services of multiple cloud service providers of different metropolitan areas via partner network service providers, in accordance with techniques described in this disclosure. In this example, customer network 308 may access cloud exchange point 303 within a data center 300 that may represent a cloud exchange of one metropolitan area to receive aggregated cloud services, each of which is associated with a different cloud service provider. Customers not physically connected to data center 300 may also use NSP network 306 (otherwise referred to as "partner NSP 306") to access cloud exchange point 303 within data center 300 to also receive the aggregated cloud services.

FIG. 3A illustrates an example data center 300 to provide connectivity for a customer network of one metro via partner NSP network 306 to access cloud service providers 320A, 320B (collectively, "CSPs 320") of a different metro. Customer network 308 and partner NSP network 306 each include endpoint devices that consume cloud services provided by cloud service providers 320. Example endpoint devices include servers, smart phones, television set-top boxes, workstations, laptop/tablet computers, video gaming systems, teleconferencing systems, media players, and so forth.

Customer network 308 and/or partner NSP network 306 include respective provider edge/autonomous system border routers (PE/ASBRs) 310A-310B. Each of PE/ASBRs 310A, 310B may execute exterior gateway routing protocols to peer with PE router 302 ("PE 302") over one of access links 316A-316B (collectively, "access links 316"). In the illustrated example, access link 316A represents a transit link between an edge router of customer network 308 and an edge router (or autonomous system border router) of cloud exchange point 303. Similarly, access link 316B represents a transit link between an edge router of partner NSP network 306 and an edge router of cloud exchange point 303. For example, PE 310B and PE 302 may directly peer via an exterior gateway protocol, e.g., exterior BGP, to exchange L3 routes over access link 316B and to exchange L3 data traffic between partner NSP network 306 and cloud service provider networks 320. Access links 316 may in some cases represent and alternatively be referred to as attachment circuits for IP-VPNs configured in IP/MPLS fabric 301, as described in further detail below. Access links 316 may in some cases include a direct physical connection between at least one port of customer network 308 or partner NSP network 306 and at least one port of cloud exchange point 303, with no intervening transit network. That is, cloud exchange point 303 may provide at least one port to partner NSP network 306. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between a partner NSP network 306 and cloud service provider networks 320. For example, a port of PE router 302 may be configured with an L2 interface that provides, to partner NSP network 306, L2 connectivity to CSP 320A via access link 316B and router 312A coupled to a port of PE router 304 that is also configured with a L2 interface. The port of PE router 302 may also be configured with an L3 interface that provides, to partner NSP network 306, L3 connectivity to CSP 320B via access link 316B. PE 302 may be configured with multiple L2 and/or L3 sub-interfaces such that partner NSP network 306 may be provided, by the cloud exchange provider, with a one-to-many connection to multiple cloud service providers 320.

To create an L2 interconnection between partner NSP network 306 and cloud service provider networks 320, in some examples, IP/MPLS fabric 301 is configured with an L2 bridge domain (e.g., an L2 virtual private network (L2VPN) such as a virtual private LAN service (VPLS), E-LINE, or E-LAN to bridge L2 traffic between a customer-facing port of PEs 302 and a CSP-facing port of cloud service providers 320. In some cases, a cloud service provider 320 and partner NSP network 306 may have access links to the same PE router 302, 304, which bridges the L2 traffic using the bridge domain.

To create an L3 interconnection between partner NSP network 306, in some examples, IP/MPLS fabric 301 is configured with L3 virtual routing and forwarding instances (VRFs), as described in further detail below with respect to FIG. 4.

Each of access links 316 and aggregation links 322 may include a network interface device (NID) that connects partner NSP network 306 or cloud service provider 320 to a network link between the NID and one of PE routers 302, 304. Each of access links 316 and aggregation links 322 may represent or include any of a number of different types of links that provide L2 and/or L3 connectivity.

Access links 316 include physical links. PE/ASBRs 310A-310B and PE router 302 exchange L2/L3 packets via access links 316. In this respect, access links 316 constitute transport links for cloud access via cloud exchange point 303. Cloud exchange point 303 may represent an example of any of cloud exchange points 128, 128' of FIG. 1. Data center 300 may represent an example of data center 201A or 201B of FIG. 2.

Cloud exchange point 303, in some examples, provides a customer of a different metro access to cloud exchange point 303 via partner NSP network 306 and thence to any one or more cloud service providers 320. FIG. 3A, e.g., illustrates access link 316B connecting partner NSP network 306 to PE router 302 of cloud exchange point 303. PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) to partner NSP network 306 in order to provide services to a customer network of a different metro. That is, an enterprise buyer desiring to connect to CSP networks 320 of a different metro does not need to negotiate and contract service links directly with partner NSP network 306 to establish physical cross connects to the different metro. Cloud exchange point 303 may instead cross-connect cloud aggregation link 322A and PE 312A of CSP network 320A to cloud access link 316B to provide layer 3 peering and network reachability for the cloud services delivery on behalf of the enterprise buyer.

In addition, partner NSP network 306 need only to have configured a single cloud access link (here, access link 316B) to cloud exchange point 303 within data center 300 in order to obtain services from multiple cloud service provider networks offering cloud services via cloud exchange point 303. That is, the customer of partner NSP network 306 does not need to provision and configure separate service links connecting partner NSP network 306 to different PE routers 312, for instance, in order to obtain multiple CSPs 320. Cloud exchange point 303 may instead cross-connect cloud access link 316B (again, as one example) to multiple cloud aggregate links 322 to provide layer 3 peering and network reachability for the cloud services delivery to partner NSP network 306.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312B that each executes an exterior gateway routing protocol, e.g., eBGP, to exchange routes with PE router 304 of cloud exchange point 303. Each of CSP networks 320 may represent a public, private, or hybrid cloud of a respective metropolitan area. Each of CSP networks 320 may have an assigned autonomous system number or be part of the autonomous system footprint of cloud exchange point 303.

In the illustrated example, an Internet Protocol/Multiprotocol label switching (IP/MPLS) fabric 301 interconnects PE 302 and PE 304. IP/MPLS fabric 301 includes one or more switching and routing devices, including PEs 302, 304, that provide IP/MPLS switching and routing of IP packets to form an IP backbone. In some examples, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect partner NSP network 306 with service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange points within cloud exchange 303 as described herein 'transports' service traffic and cross-connects cloud service provider networks 320 of one metro to customers of another metro via partner NSP network 306. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein.

Access links 316 and aggregation links 322 may include attachment circuits that associate traffic, exchanged with the connected partner NSP network 306 or service provider network 320, with virtual routing and forwarding instances (VRFs) configured in PEs 302, 304 and corresponding to IP-VPNs operating over IP/MPLS fabric 301. For example, PE 302 may exchange IP packets with PE 310B on a bidirectional label-switched path (LSP) operating over access link 316A, the LSP being an attachment circuit for a VRF configured in PE 302. As another example, PE 304 may exchange IP packets with PE 312A on a bidirectional label-switched path (LSP) operating over access link 322A, the LSP being an attachment circuit for a VRF configured in PE 304. Each VRF may include or represent a different routing and forwarding table with distinct routes.

In examples with more than one PE/ASBR in IP/MPLS fabric 301, IP/MPLS fabric 301 may be configured in respective hub-and-spoke arrangements for cloud services. In other examples, the cloud exchange point 303 provider may configure a full mesh arrangement whereby a set of PEs are each coupled to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330B (collectively, "virtual circuits 330") to interconnect customers of partner NSP network 306 and service provider networks 320 with end-to-end IP paths (as further described in FIGS. 5A, 5B). Each of service providers 320 and the customers of partner NSP network 306 may be an endpoint for multiple virtual circuits 330, with multiple virtual circuits 330 traversing one or more attachment circuits between a PE/PE pair for the IP/MPLS fabric 301 and the CSP/NSP. A virtual circuit 330 represents a layer 3 path through IP/MPLS fabric 301 between an attachment circuit connecting a customer of partner NSP network 306 to the fabric 301 and an attachment circuit connecting a service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another via respective network service providers of different metropolitan areas.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304 via a routing protocol (e.g., eBGP) peering connection with PE 304. PE 304 associates the route with an associated VRF that includes PE router 302. PE 304 then exports the route to PE router 302. PE router 304 may export the route specifying PE router 304 as the next hop router. PE router 302 sends the route to PE router 310B via a routing protocol connection with PE 310B. PE router 302 may send the route after adding an autonomous system number of the cloud exchange point 303 (e.g., to a BGP autonomous system path (AS_PATH) attribute) and specifying PE router 302 as the next hop router. Cloud exchange point 303 is thus an autonomous system "hop" in the path of the autonomous systems from partner NSP network 306 to cloud service providers 320 (and vice-versa). PE router 310B installs the route to a routing database, such as a BGP routing information base (RIB) to provide layer 3 reachability to cloud service provider network 320A. In this way, cloud exchange point 303 "leaks" routes from cloud service provider networks 320 to partner NSP network 306, without cloud service provider networks 320 to partner NSP networks 306 requiring a direct layer peering connection.

PE routers 310B, 302, 304, and 312A may perform a similar operation in the reverse direction to forward routes originated by a customer of NSP network 306 to PE 312A and thus provide connectivity from cloud service provider network 320A of one metro to a customer in another metro. In the example of virtual circuit 330B, PE routers 312B, 304, 302, and 310B exchange routes for partner NSP network 306 and cloud service provider 320B in a manner similar to that described above for establishing virtual circuit 330A. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a partner NSP network 306 having a single access link 316B to the cloud exchange point 303. With the techniques described herein, cloud exchange point 303 may fully interconnect customers of partner NSP network 306 in one metro and cloud service provider networks 320 in a different metro with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PE 304 may be configured to import routes from PE 302 and to export routes received from PEs 312, using different asymmetric route targets. Likewise, PE 302 may be configured to import routes from PE 304 and to export routes received from PEs 310 using the asymmetric route targets. Thus, PEs 302, 304 may be configured to implement advanced L3VPNs that each includes a basic backbone L3VPN of IP/MPLS fabric 301 together with extranets of partner NSP network 306 and any of cloud service provider networks 320 attached to the basic backbone L3VPN. Each advanced L3VPN constitutes a cloud service delivery network from a cloud service provider network 320 to partner NSP network 306, and vice-versa. In this way, cloud exchange point 303 enables any cloud service provider network 320 to exchange cloud service traffic with customers of partner NSP network 306 in a different metro while internalizing the layer 3 routing protocol peering connections that would otherwise be established between partner NSP network 306 and cloud service provider networks 320 for any cloud service connection. In other words, the cloud exchange point 303 allows partner NSP network 306 and cloud service provider networks 320 to establish a single (or more for redundancy or other reasons) layer 3 routing protocol peering connection to the data center-based layer 3 inter-connect by pre-provisioning the partner NSP to establish an inter-metro network service provider network. By filtering routes from cloud service provider networks 320 to partner NSP network 306, and vice-versa, PEs 302, 304 thereby control the establishment of virtual circuits 330 and the flow of associated cloud service traffic between a customer of partner NSP network 306 in one metro and cloud service provider networks 320 of another metro. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
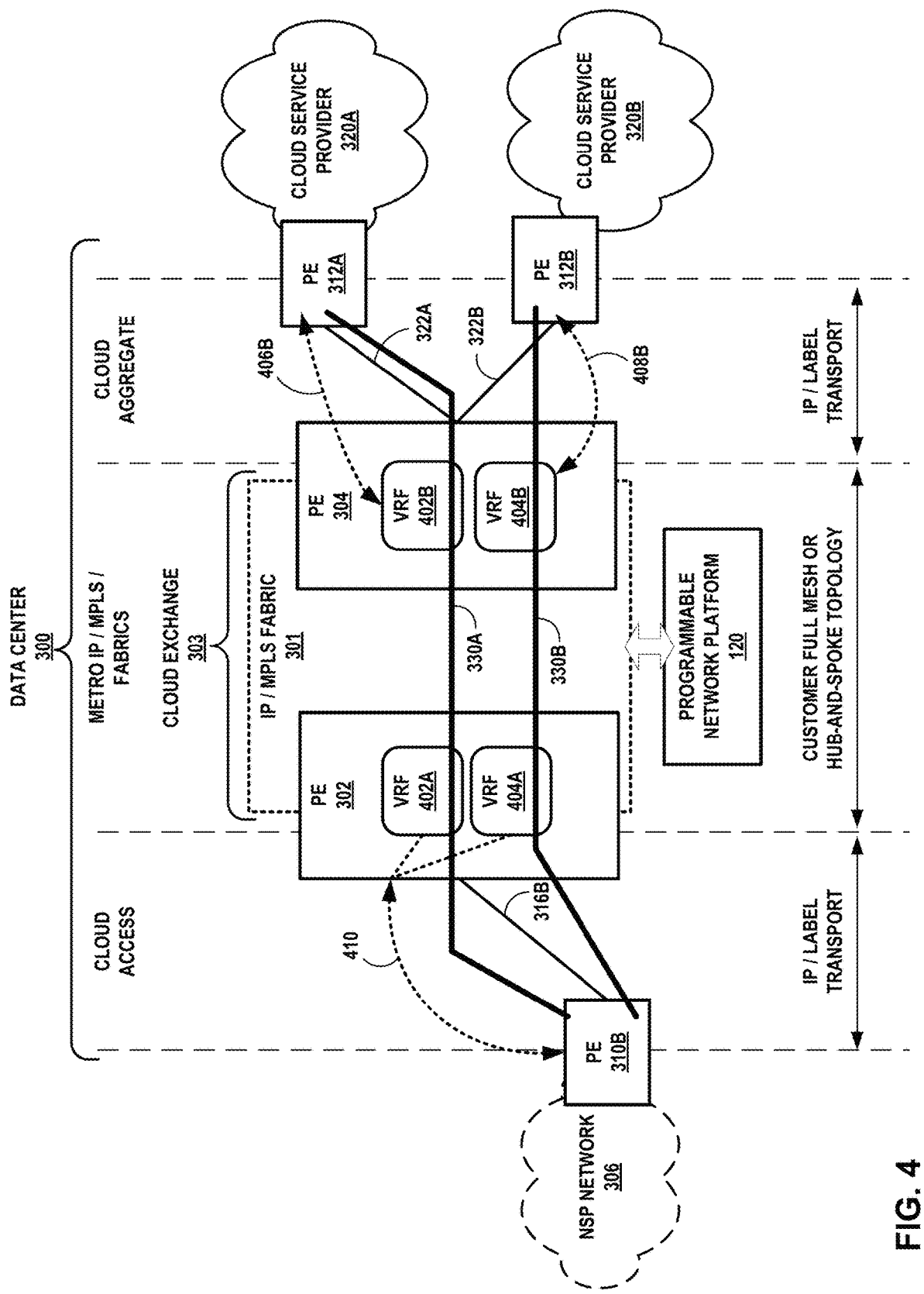
FIG. 4 is a block diagram illustrating an example of a data center-based cloud exchange point in which routers of the cloud exchange point are configured by a programmable network platform with VPN routing and forwarding instances for routing and forwarding aggregated service traffic from multiple cloud service provider networks of one metropolitan area to a customer network of a different metropolitan area, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks of one metropolitan area to a customer of partner NSP network 306 of a different metro, according to techniques described herein.

In this example, a virtual router of the cloud-based services exchange point is provisioned to receive respective layer 3 routes for the cloud service provider networks through the NSP. For example, to establish virtual circuits 330A-330B, PE routers 302 and 304 of IP/MPLS fabric 301 are configured with VRFs. PE 302 is configured with VRFs 402A and 404A, while PE 304 is configured with VRFs 402B and 404B.

VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 404B, and VRF 404B is configured to import routes exported by VRF 404A. The configuration may include asymmetric route targets for import/export between VRFs 402A, 402B. This configuration whereby a customer is able to access multiple layer 3 services from different CSPs each associated with separate VRFs to access the layer 3 services provides isolation of respective traffic exchanged with the CSPs.

In some examples, PE 302A may be configured with a single VRF to import routes exported by both VRF 402B and VRF 404B. As noted above with respect to FIGS. 3A-3B, PEs 302, 304 may be further configured to bridge layer 2 traffic between partner NSP network 306 and cloud service providers 320.

In this example, PE 304 operates BGP or other route distribution protocol peering connections 406B, 408B with respective PEs 312A, 312B to exchange routes with respective cloud service provider networks 320A, 320B. PE 302 operates BGP or other route distribution protocol peering connection 410 with PE 310B to exchange routes with partner NSP network 306. In some examples, PEs 302, 304 may be statically configured with routes for the site networks.

An administrator or a programmable network platform described herein for cloud exchange point 303 may configure PEs 302, 304 with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based inter-connectivity. Cloud exchange point 303 may thus provide dedicated cloud service provider access to partner NSP network 306 by way of private and/or public routes for the service provider networks 320.

In the northbound direction, cloud exchange point 303 of data center 300 may provide dedicated cloud service provider distribution to partner NSP network 306 by way of private and/or public routes for partner NSP network 306. Neither PE 310B nor any of PEs 302, 304 need access to the full Internet BGP routing table in order to reach cloud service provider networks 320 or partner NSP network 306. Moreover, PEs 302, 304 may be configured to aggregate customer/CSP routes and/or service traffic based on any one or more of physical, IP, service, and VRFs.

Figure 5A:
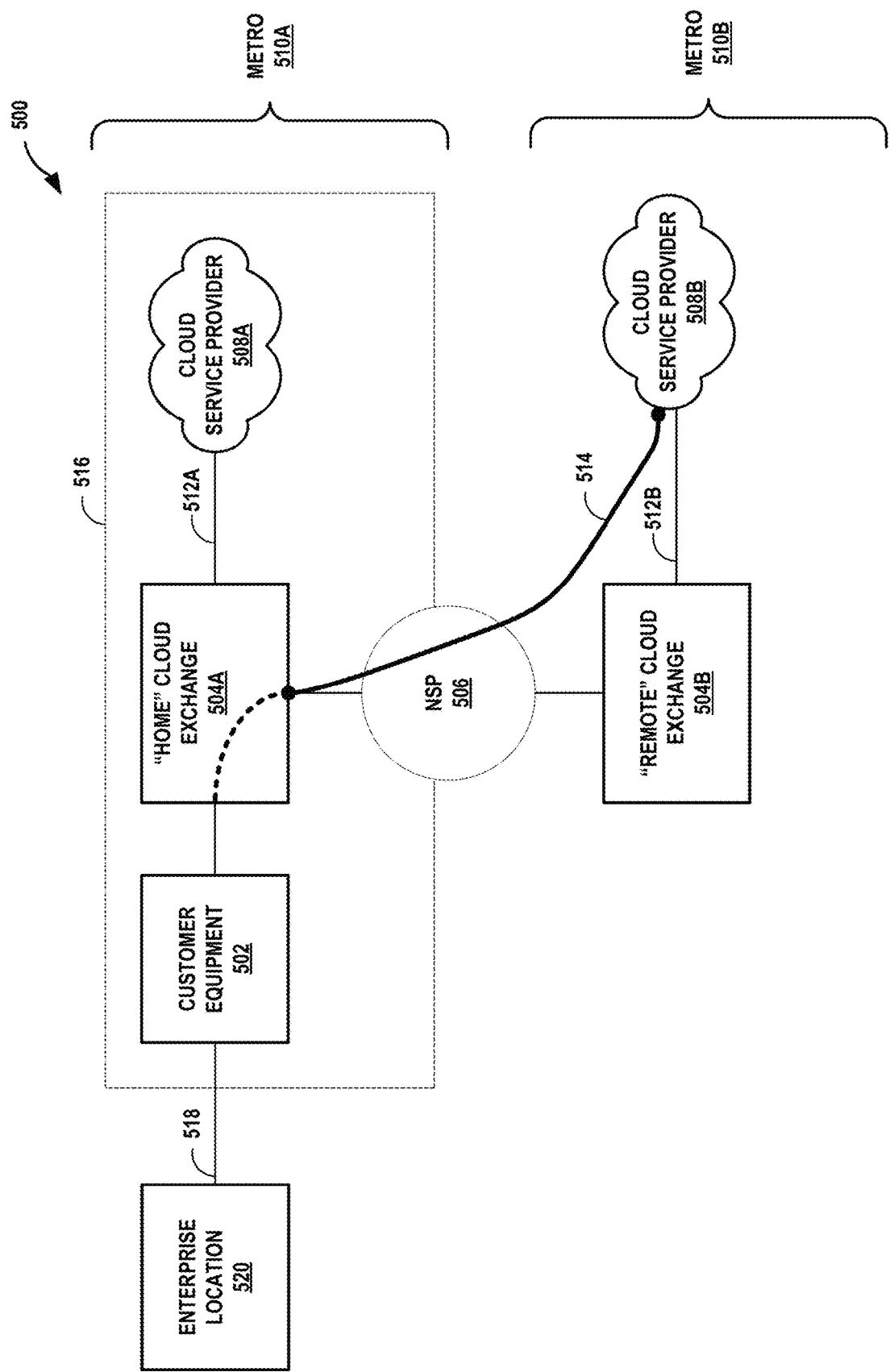
FIGS. 5A-5B illustrate other conceptual views of a network system having an inter-connecting metro-based cloud exchange that provides cloud services of a "remote" cloud exchange to customers of a "home" cloud exchange through a network service provider according to techniques described herein.
Figure 5B:
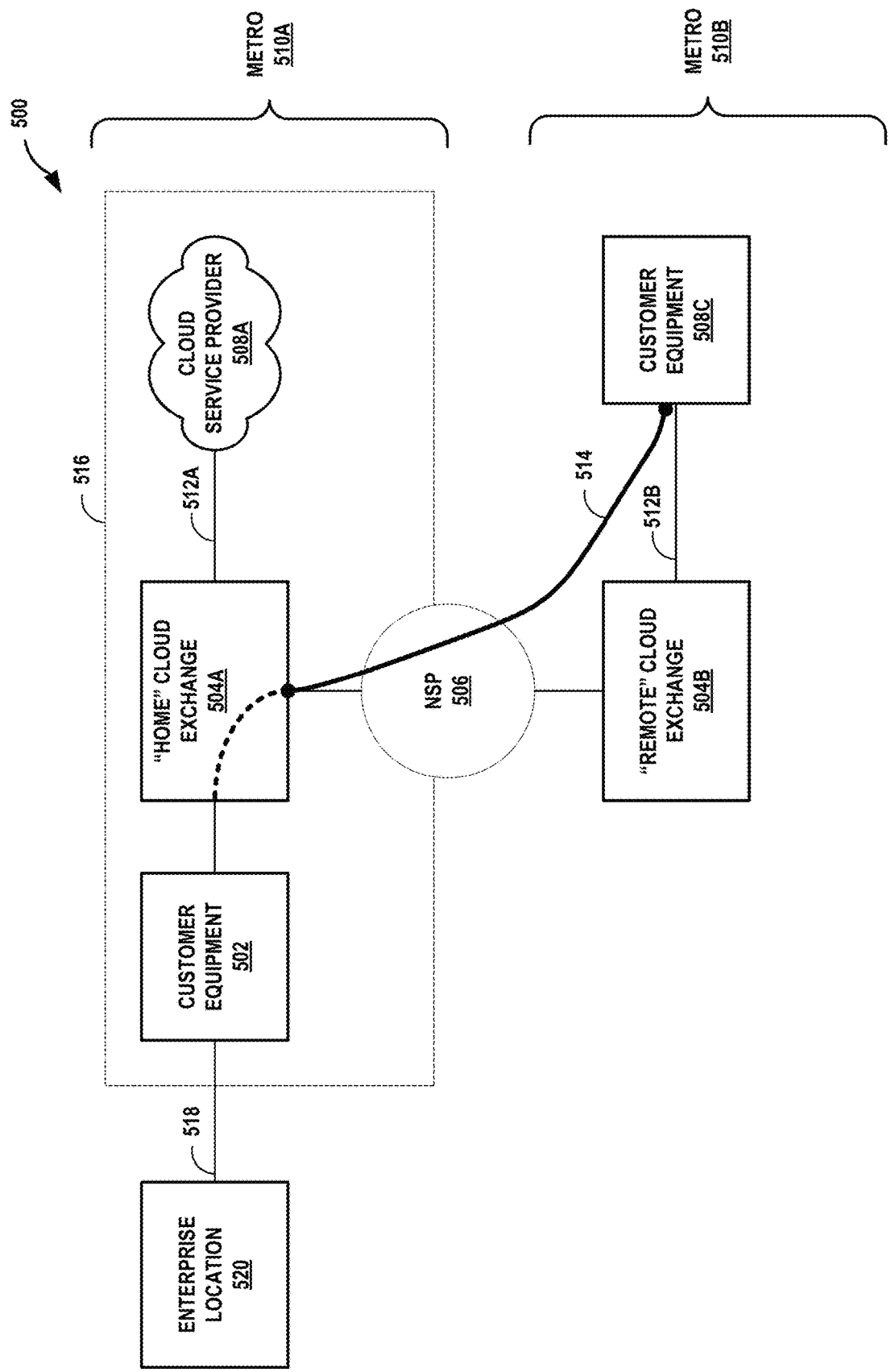

FIGS. 5A-5B illustrate other conceptual views of a network system 500 having an inter-connecting metro-based cloud exchange that provides cloud services of one cloud exchange (e.g., "home" cloud exchange) to customers of a another cloud exchange (e.g., "remote" cloud exchange) through a partner network service provider according to techniques described herein. Data center 516 may represent data center 201A of FIG. 2, and data center 300 of FIGS. 3-4, for example. In the example of FIG. 5A, customer equipment 502 may represent equipment (e.g., a rack in data center 516) belonging to any of customers 108 and 308 of FIG. 1-3, respectively. The customer, such as an enterprise, can access customer equipment 502 from an enterprise location 520 outside of data center 516 via private line 518.

In the example of FIG. 5A, a customer at enterprise location 520 connected to customer equipment 502 may access the "home" cloud exchange 504A to access cloud service provider 508A. Data center 516 of metro 510A may include a "home" cloud exchange 504A with a virtual circuit 512A connected to cloud service provider 508A within the same metro. In one example, customer equipment 502 may need to connect to cloud service provider 508B of metro 510B. According to the techniques described in this disclosure, "home" cloud exchange 504A may inter-connect with "remote" cloud exchange 504B via a partner network service provider 506 and virtual circuit 512B to cloud service provider 508B of metro 510B. As further described herein, customers (e.g., enterprise location 520) of partner network service providers, such as 506, may purchase virtual circuit 512B to cloud service provider 508B of "remote" cloud exchange 504B. In some examples, NSP 506 may represent a network (or network connection) operated by the cloud exchange provider. In any event, "home" cloud exchange 504A may provide an end-to-end circuit 514 from the cloud service provider 508B to the "home" cloud exchange 504A via a connection between network service provider 506 and "remote" cloud exchange 504B.

In another example as shown in FIG. 5B, customer equipment 502 may need to connect to customer equipment 508C of metro 510B. Like the technique described above, a customer (e.g., enterprise location 520) of partner network service provider 506 may purchase virtual circuit 512B to customer equipment 508C of "remote" cloud exchange 504B. "Home" cloud exchange 504A may provide an end to end circuit 514 from a customer equipment 508C of metro 510B to the "home" cloud exchange 504 via a connection between network service provider 506 and "remote" cloud exchange 504B. In this way, the partner network service provider 506 may provide inter-metro connectivity of cloud-based services from cloud services providers and/or customer equipment of a different metropolitan area.

Figure 6:
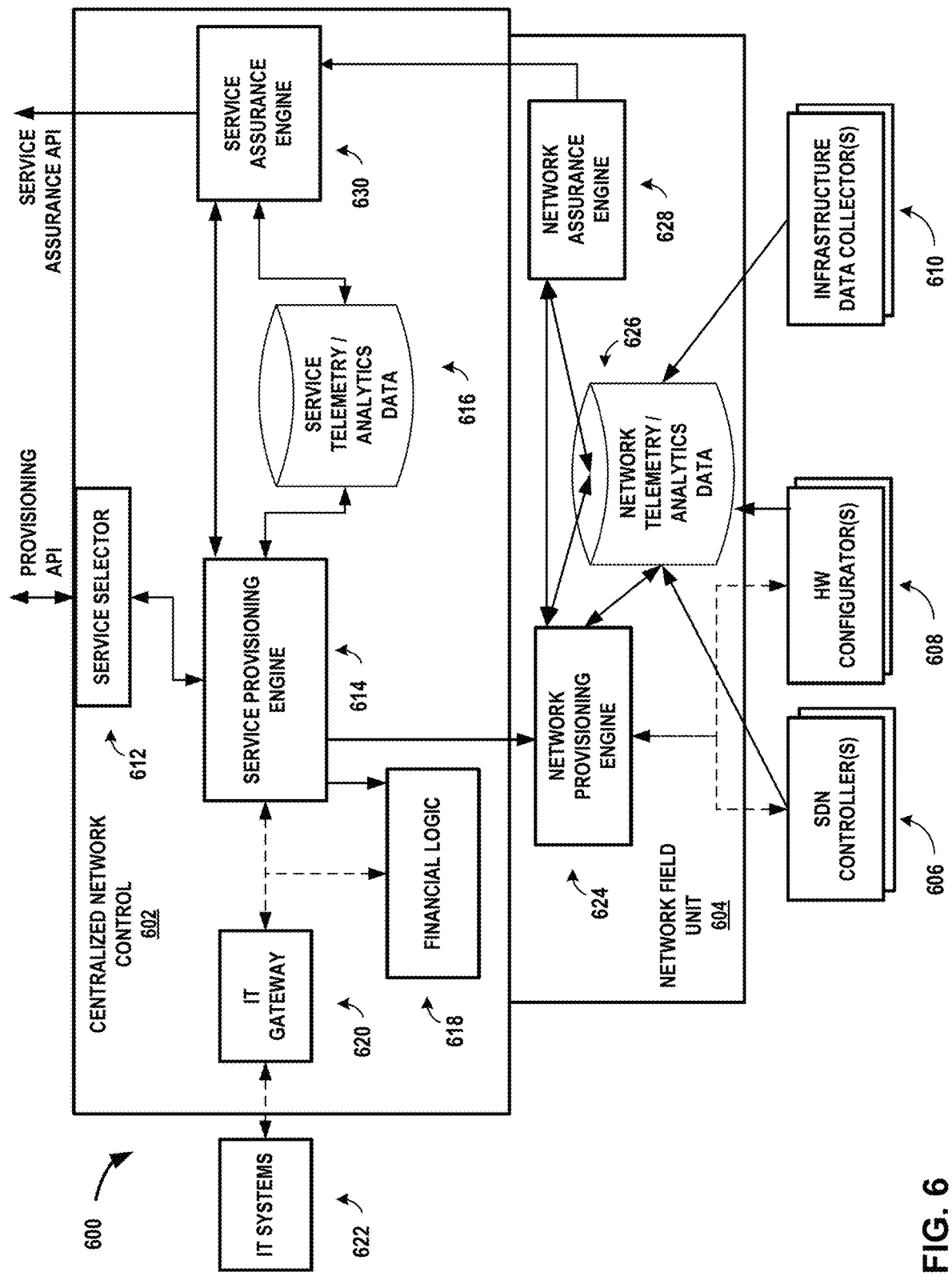
FIG. 6 is a block diagram illustrating a platform for a software controlled network, the platform operating in accordance with one or more techniques of the present disclosure.

FIG. 6 is a block diagram illustrating a platform for a software controlled network, the platform operating in accordance with one or more techniques of the present disclosure. FIG. 6 illustrates a programmable network platform 600 that includes multiple components, which collectively provide for dynamic configuration and management of a cloud-based services exchange, or "cloud exchange." These components may provide virtual connections for cloud services delivery from multiple cloud service providers to one or more cloud customers via respective network service providers (NSPs) of different metropolitan areas (metros). Programmable network platform 600 includes centralized network control (CNC) system 602, one or more network field units (NFUs) 604, software-defined networking (SDN) controllers 606, hardware configurators 608, infrastructure data collectors 610, and information technology systems (622).

Programmable network platform 600 may provide for the orchestration of a service across multiple service providers and allow one of the service providers to be the service owner in terms of the service monitoring, assurance and billing. Programmable network platform 600 may provide the process and apparatus for multiple service provider orchestration system to securely communicate with each other across different metropolitan areas to deliver a combined service on demand in a single click manner. Programmable network platform 600 may represent an example instance of programmable network platform 120 or another programmable network platform, controller, or system described herein for provisioning respective NSPs of a different metro and assuring service delivery.

In the example of FIG. 6, CNC system 602 enables the automation of aspects of cloud services provisioning. As such, CNC system 602 may provide one or more software interfaces that allow customers to establish, de-install and manage interconnections with multiple, different cloud providers of different metros participating in the cloud exchange in an automated and seamless manner. CNC system 602 may include logic to receive a business service request via an API call and convert that into the necessary business instantiation parameters and network provisioning parameters to be delivered and assured as a business service. CNC system 602 may be the central intelligent processing unit of the orchestration system (e.g., programmable network platform 600) and there may be one logical instance of this intelligent logic present per instantiation. CNC system 602 also has the capability of communicating with a third party orchestration system if needed by the service request. CNC system 602 may provide service assurance using a Monitor, Analyze, Plan and Execute (MAPE) loop methodology, as further discussed in this disclosure, and is implemented to ensure the service level agreements are adhered to by the service.

In some examples, NFU 604 is implemented as a self-contained unit that receives requests or instructions from CNC system 602 to configure network infrastructure of a cloud exchange point for one or more services. For instance, NFU 604 may comprise a combination of hardware and software. In some examples, NFU 604 may be a virtual machine. In any case, NFU 604 receives requests or instructions CNC system 602 based on customer requests submitted to CNC system 602. As further described below, NFU 604 may determine whether sufficient resources exist to provide the services requested by CNC system 602. If sufficient resources exist, NFU 604 may communicate or otherwise interoperate with SDN controller 606, hardware configurators 608, and infrastructure data collectors 610 to configure the network infrastructure to provide the requested service. NFU 604 may represent a globally distributed intelligent logical unit that receives network instantiation commands from CNC system 602 and instantiates and configures the network resource that is needed to deliver the service. NFU 604 may have the intelligence to deliver and assure network services as per the request of CNC system 602.

In some examples, multiple cloud exchange points may be geographically dispersed across different metros. Each geographically positioned cloud exchange point may have a corresponding NFU that is geographically positioned at respective metropolitan areas as the respective cloud exchange point accessible by a respective partner NSP. The corresponding NFU may configure and otherwise manage the network infrastructure of the particular geographically-positioned cloud exchange point by configuring and managing the respective NSP of a corresponding metropolitan area. In this way, a particular NFU may receive requests or instructions from CNC system 602 and configure the network infrastructure of the cloud exchange point that is managed by the particular NFU. In some cases, multiple cloud exchange points of different metropolitan areas make up an inter-connected metro-based cloud exchange managed by a single NFU.

NFU 604 may therefore represent the distributed processing unit of programmable network platform 600, which provides programmable network platform 600 with the ability to horizontally scale and deliver and assure services. NFU 604 is the component of programmable network platform 600 that may provide the functionality of delivering the services in a vendor agnostic and form factor agnostic manner. As shown in FIG. 6, NFU 604 has several software components that enable the distributed processing unit to deliver the services across respective network service providers of different metropolitan areas.

In order to provision services and virtual connections to cloud customers and cloud service providers via respective network service providers of different metropolitan areas, CNC system 602 includes a service selector 612. In some examples, service selector 612 may operate as an API gateway. For example, service selector 612 may expose software interfaces defined according to one or more APIs. Requests and/or instructions received by service selector 612 may be include the form of create, read, update, and/or delete (CRUD) requests made with respect to services provided by and/or delivered by the cloud exchange. Applications may invoke endpoints of the APIs provided by service selector 612, which may in turn invoke service provisioning engine 614. Service selector 612 may execute on one or virtual machines and/or real servers, for instance. Although shown as a single element in FIG. 6, service selector 612 may comprise a cluster of one or more physical and/or virtual computing machines executing on one or more physical processors. In some aspects, service selector 612 provides a service catalog that describes available services and providers for the available services.

Service provisioning engine 614 may receive requests to provision services from service selector 612. Service provisioning engine 614, in conjunction with network field unit 604, organizes, directs and integrates underlying hardware and software sub-systems for managing various aspects of service provisioning within the network infrastructure as well as cloud services management. For instance, service provisioning engine 614 may provide a rule-driven workflow engine that operates between service selector 612 and the underlying interconnect platform of a cloud exchange that is configured by network field unit 604. In this way, service provisioning engine 614 can be invoked via service selector 612 by customer-proprietary applications, a cloud provider-based customer portal, and/or cloud service provider systems, for direct participation with the programmable network platform of a cloud exchange network infrastructure that is configured by network field unit 604. Service provisioning engine 614 may include a third-party service connector that communicates with the third party orchestration systems to ensure that the service is adequately networked together to provide the end-to-end cloud-based service fulfillment. As further described below, NFU 604 may receive instructions and/or requests from CNC system 602, which NFU 604 uses to provision services at one or more cloud exchange points in different metropolitan areas.

Service provisioning engine 614 may query and store service telemetry and analytics data (STAD) 616 in one or more data stores. STAD 616 may include metrics about the quantity, type, definition, and consumers of respective partner NSPs of a corresponding metro that are configured by service provisioning engine 614. STAD 616 may include analytics information based on raw metrics data from NFU 604. For instances, analysis information of STAD 616 may include historical statistics and/or real-time statistics, which may be analyzed on various dimensions, such as consumer, service type, service use, to name only a few examples.

CNC system 602 may also include financial logic 618. Financial logic 618 may store accounting information for customers. For instance, financial logic 618 may store billing information for customers, such as name, address, phone number, email, to name only a few examples. When service provisioning engine 614 configures a service for a customer that includes a service charge, financial logic 618 may store such expense information. In this way, financial logic 618 may provide an accounting of services purchased by a customer and provide billing for such services.

CNC system 602 may include Information Technology (IT) gateway 620 that interfaces with IT systems 622. IT systems 622 may include one or more computing devices, such as desktop computers, tablets, smartphones, and servers, to name only a few examples. IT systems 622 may provide one or more user interfaces to administrators, which may use IT systems 622 to administer CNC system 602. IT systems 622 may, for example, receive user inputs to configure CNC system 602 and/or NFU 604. Based on the user inputs, IT systems 622 may send requests and/or instructions to CNC system 602, which are received by IT gateway 620. In some examples, CNC system 602 may provide or otherwise expose one or more RESTful interfaces that can be called or otherwise invoked by IT systems 622. IT gateway 620 may route such instructions or requests to other components within CNC system 602 for further processing based on the type of requests and/or instructions.

As described above, NFU 604 may receive requests or instructions from CNC system 602 to provision one or more services. Network provisioning engine 624 may receive the requests and/or instructions from service provisioning engine 614. Network provisioning engine 624 may determine whether sufficient resources exist to satisfy a request for a service to be configured at a cloud exchange point. In some examples, network provisioning engine 624 may query one or more components such as SDN controller 606, hardware configurators 608, and/or network telemetry and analytics data (NTAD) 626. If sufficient resources exist to provision a requested network service provider of a different metropolitan area, network provisioning engine 624 may send instructions and/or requests to one or more of SDN controller 606 and/or hardware configurators 608 that cause each respective component to be configured to provision the requested service. For example, following an order from a buyer of a "home" cloud exchange, e.g., data center 201A, in one metro, a partner NSP buys a virtual circuit to the cloud service provider of a remote data center, e.g., data center 201B, in a different metro. The partner NSP configures an end-to-end circuit back to the home data center. The partner NSP then provides a service key for the home data center. As such, network provisioning engine 624 provides the functionality of selecting the network service provider (e.g., the service key for the home data center) of a metropolitan area, vendor, and form factor so that the buyer may purchase a virtual circuit to the partner NSP at the home data center in which the service is to be delivered. Network provisioning engine 624 also provides the policy manager functionality to ensure the service is delivered in the correct order of operations.

In some examples, network provisioning engine 624 of NFU 604 may include a Network Appliance Sizing Engine (not shown) that provides the functionality of ensuring the network appliance is properly sized for the appropriate service level agreement (SLA) to be delivered by the appliance. In some examples, NFU 604 may include a Device Selection and Handler (not shown) that provides the functionality of selecting the correct device within a respective network service provider to deliver the service, and convert the network commands to the appropriate configuration commands for the selected device. For example NFU 614 may access a list that describes the capabilities of virtual and/or dedicated appliances of a different metropolitan area within the cloud exchange for providing native services, such as firewall (FW), network address translation (NAT), and deep-packet inspection (DPI), to service traffic traversing the cloud exchange. NFU 604 may select a device from the list to satisfy the service request.

Network provisioning engine 624 may query and store network telemetry and analytics data (NTAD) 626 in one or more data stores. NTAD 626 may include metrics about the quantity, type, and definition, of network and resource configurations that are configured by NFU 604. NTAD 626 may include analytics information from infrastructure data collectors 610 based on raw metrics data for resources used in a particular service. For instance, analysis information of NTAD 626 may include historical statistics and/or real-time statistics.

As shown in FIG. 6, one or more SDN controllers 606 may configure network resources, such as routers, switches, bridges, and the like, which provide the physical infrastructure to carry network traffic through cloud exchange points across different metros. One or more hardware configurators 608 may configure hardware resources, such as servers or the above-mentioned network resources; resources within servers and network resources including processor allocation, memory allocation; storage appliances; other hardware resources; and software configurations that may be configured to provision respective network service providers of a corresponding metro to a customer of a different metro. One or more infrastructure data collectors 610 may collect metrics about the quantity, type, and definition, of network and resource configurations that are configured by NFU 604. For instance, infrastructure data collectors 610 may monitor and measure metrics of network resources and any other resources configured to provision the respective network service providers to a customer. Infrastructure data collectors 610 may store such metrics in NTAD 626.

NFU 604 and CNC system 602 may include network assurance engine 628 and service assurance engine 630, respectively. Network assurance engine 628 may determine, based on NTAD 626, whether infrastructure configured to provide the respective network service providers are providing a satisfactory level of service. For example, outages, resource consumption overages, hardware and/or software failures or problems, and other events may affect the quality of services provided by the network infrastructure at cloud exchange points across different metropolitan areas. Network assurance engine 628 may monitor NTAD 626, and in some cases, send information to service assurance engine 630. In some examples, the information may include alerts if service levels are not being met, or more specifically alerts for outages, resource consumption overages, hardware and/or software failures or problems. In some examples, information sent by network assurance engine 628 to service assurance engine 630 may be informational rather than based on a specific event. For instance, network assurance engine 628 may send information about the performance of infrastructure to service assurance engine on a particular schedule or interval, and/or on continuous or real-time basis. In some examples NTAD 626 may contain a set of structured and/or unstructured databases that enable the service provisioning engine 614 and network assurance engine 628 to appropriately store and retrieve data to support the operation of programmable network platform 600.

Network assurance engine 628 may provide the functionality of assuring the network configuration created is assured as per the networking SLAs requested by CNC system 602. The Network Assurance Engine is comprised of several sub-components that deliver the assurance through a MAPE loop including: (1) Monitoring, which is performed by several data collectors that are programmed to monitor and gather data for a given service; (2) Analyzing, which analyzes the data collected by the data collectors to compare and ensure that the services are compliant with the requested SLAs (3) Planning, which in the event a service or set of services are out of compliance, a planning module will make the decisions if the current non-compliance can be mitigated locally or needs to escalated to the CNC system 602 for further processing; and (4) Executing, which is based on the decisions taken by the planning module to execute actions in the event the non-compliance can be locally mitigated.

Service assurance engine 630 may receive information from network assurance engine 628 and may compare the information with service level information, such as service level agreements, included in STAD 616. By comparing information about the performance of infrastructure (e.g., the performance of the respective network service provider of a corresponding metropolitan area) with service level information in STAD 616, service assurance engine may send service level information to customers using one or more service assurance APIs, and whether such service level agreements are being met. In this way, customers may monitor or otherwise evaluate the quality of service provided by one or more cloud exchange points.

As described above, programmable network platform 600 may bridge business systems, such as customers and cloud service providers, with operations systems, such as the network infrastructure of one or more cloud exchange points across different metropolitan areas to improve operational efficiency. As such, programmable network platform 600 may provide improved visibility to monitor and assure the end-to-end service and its components. Accordingly, programmable network platform 600, unlike conventional systems, may include the capability to perform the provisioning and assurance of services across multiple orchestration systems for multiple cloud providers of different metropolitan areas. CNC system 602 may operate as the master controller that performs the function of receiving a service request that encapsulates the business requirements for the service, and using business, network and partner sub-system logic to instantiate and assure the service. As shown in FIG. 6, CNC system 602 is made up of multiple different software modules performing different functions of fulfilling a service request. Programmable network platform 600 may provide a distributed orchestration system for creating services and distributing the intelligence of delivering and assuring services. Additionally, programmable network platform 600 may provide a distributed system that is able to communicate with third party service orchestration systems and deliver a distributed service.

Programmable network platform 600 may provide service orchestration of a business level service across heterogeneous service providers of different metropolitan areas. The definition of the respective network service provider policy, quality (e.g., latency), service level agreements, existing relationship and cost as a coordinated service topology may be provided at programmable network platform 600. Programmable network platform 600 may define the individual sub-component level topology, policy, SLA and cost in terms of specification and enforcement.

Programmable network platform 600 is an intelligent centralized service delivery and assurance system with the ability to have fault mitigation Monitor/Analyze/Plan/Execute (MAPE) loop that will ensure the service delivered by the system is assured to adhere the service level agreement for the life cycle of the respective network service provider of a different metropolitan areas. Programmable network platform 600 not only delivers services that can be offered by its own delivery infrastructure but also has the capability to communicate across other third-party orchestration systems to deliver a combined homogeneous service. Programmable network platform 600, or more specifically CNC system 602, may be the central control center for both operations and business related functions to be performed.

NFU 604 and CNC system 602 may also fulfill the need for having a distributed orchestration system for creating services and distributing the intelligence of delivering and assuring service. Additionally, NFU 604 and CNC system 602 may fulfill the need for the distributed system to be able to communicate with third party service orchestration systems to deliver a distributed service. Programmable network platform 600 provides the advantage of providing a distributed, horizontally scaling architecture. CNC 602 and one or more NFUs 604 may provide the functionality of delivering and assuring a business service into two distinctly separate functions, (1) CNC—may handle the function of converting the business request into service parameters, (2) NFU—may handle the function of converting the service parameters into network parameters and instantiating the service. Additional details of the service provisioning engine, service assurance engine, network provisioning engine, network assurance engine, and programmable network are found in U.S. patent application Ser. No. 15/001,766, filed Jan. 20, 2016, entitled "MULTI-CLOUD, MULTI-SERVICE DATA MODEL," the entire contents of which are hereby incorporated by reference herein.

Figure 7:
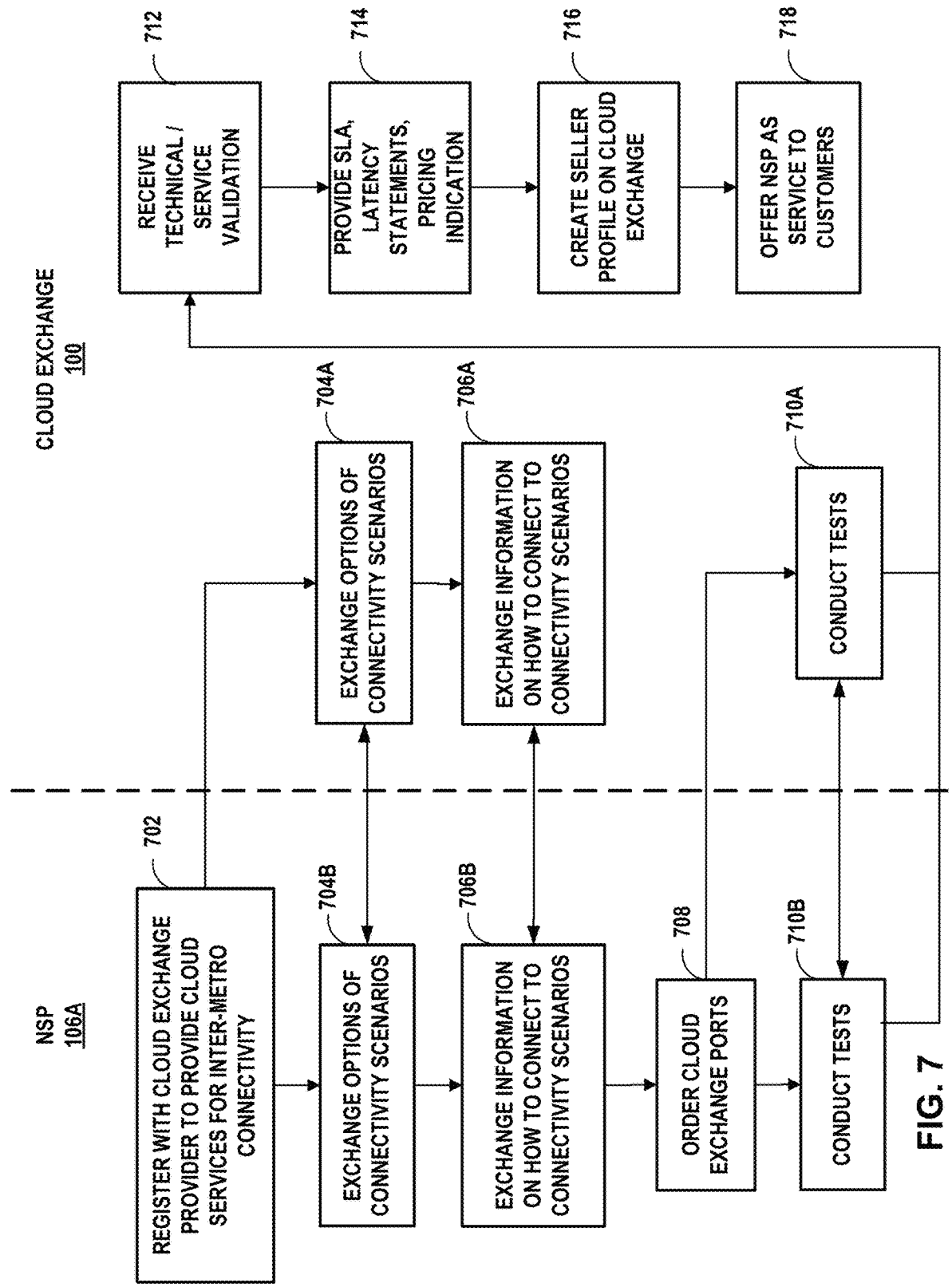
FIG. 7 illustrates an example flowchart illustrating a network service provider onboarding process, according to an example aspect of the techniques described herein.

FIG. 7 illustrates an example flowchart illustrating a network service provider onboarding process, according to the techniques described herein. An NSP may register with the cloud exchange provider to provide cloud services for inter-metro connectivity (702). Before the NSP registers with the cloud exchange provider, commercial, business development, and/or technical representatives for the NSP and cloud exchange provider may communicate to discuss service offerings. When the NSP registers with the cloud exchange provider, the NSP and cloud exchange provider may come to various agreements. For example, the NSP may agree to deploy or will deploy in a plurality of regions and/or a plurality of global regions, offer pricing for various connections (e.g., 200 megabyte, 500 megabyte, and 1 gigabyte connections), provide monthly rolling contracts for connectivity, provide route maps and latencies of network, create marketplace storefronts and populate with up to date and relevant content. The cloud exchange provider may agree to market the NSP cloud exchange connectivity solutions to customers, train sales and solutions architects of the cloud exchange provider with the NSP, create sales tools using latency, NSP routes, and terms, offer the NSP cloud exchange connectivity solutions within the programmable network platform within a marketplace, agree to co-market, and simplify the NSP procurement process, for example.

Following registration, the NSP and cloud exchange provider may exchange options of connectivity scenarios (704A/704B). The connectivity scenarios are based on locations and timescale, types of services (e.g., inter-metro cloud connectivity, plain connectivity services, etc.), types of topologies (e.g., single, redundant, multiple cloud services over purchased bandwidth. The connective scenarios may also include the cloud service providers for which the NSP may connect to. These cloud service providers may be offered by the cloud exchange provider and may be preferences or existing strategic relationships with the NSP. The connectivity scenarios may further include information on the NSP's unique selling points.

Once the connectivity scenario(s) have been selected, the cloud exchange provider and NSP may exchange information for how to connect to the connectivity scenarios (706A/706B). For instance, connectivity may be through IEEE 802.1ad (otherwise known as QinQ), in which the connection to the NSP may offer the possibility to connect to multiple route services over one bucket of bandwidth purchased from the partner. Connectivity may in some examples be made through a consistent end customer tagging between metros. This provides ease of troubleshooting between the NSP and cloud exchange provider if the same NSP tag is used for a particular end customer. Connectivity may in some examples be made through the use of buyout ports, which aids in pricing transparency as a remote virtual circuit is not charged to the NSP. This will also ensure remote L3 services can be offered. The connectivity may in some examples be made using separate ports for selling and buying in order to provide transparency.

As further described below in FIG. 8, the NSP may then order cloud exchange ports (708). The purchase of cloud exchange ports depends on several factors including the use of existing or new ports, whether the ports are standard or buyout, if the port provides encapsulation, the speed of the ports, the metros associated with the ports, and the number of ports, for example.

Before the NSP may be offered, the cloud exchange and NSP may conduct a technical and service validation tests (710A/710B). The technical validation test includes a test scenario, service profile setup, manual provisioning process, physical connectivity test, service validation document creation, and a service relationship test. For example, the technical validation test includes whether the NSP connects to the cloud exchange on single ports. The service validation test also includes whether the NSP connects to the cloud exchange on two ports. For example, as further described below in FIGS. 9A-9C, the test scenario may include: (1) a single solution using a single virtual circuit on single connection; (2) a single solution using double virtual circuits in a single connection; and (3) a redundant solution using double virtual circuits on a redundant connection. Other testing may include physical connectivity testing, such as testing end-to-end ("E2E") connectivity from the cloud service provider to the "home" cloud exchange may also be tested, latency tests, and capacity tests. The service validation test includes determining whether the cloud exchange provider may open a customer ticket with the NSP about loss of cloud connectivity, where the NSP would then need to notify the end customer of the loss of connectivity, open a ticket in the programmable network platform, and use the service validation document. In some examples, the E2E process (including portal-based circuit ordering) will also be tested.

The cloud exchange may receive from NSP a technical validation document and/or service validation document (712), which indicates a validation of the technical and service validation tests as described above.

The cloud exchange market the connections to NSP based on service level agreements, latency statements, and/or pricing information (714). As further described below in FIG. 10, the NSP may offer to the cloud exchange provider a template including standard pricing, latencies, service level agreements, and routes.

The cloud exchange provider creates a seller profile on behalf of the NSP on the cloud exchange such that buyers may be informed of the connection to different metros by the NSP (716). For example, the NSP profile may include a list of cloud services provided by cloud service provider networks of all metros where the NSP may offer connectivity to the cloud services.

Various service relationships exist, including (1) between the customer and the cloud exchange provider for port and virtual circuits on the home cloud exchange, (2) the customer and the NSP for full cloud delivery service, and (3) the NSP with the cloud exchange provider for ports on both the cloud exchange (seller on "home" and buyer on "remote").

The cloud exchange provider may offer the NSP Network as a Service (NaaS) to customers to provide inter-metro cloud services connectivity (718). The cloud exchange provider can follow a similar process for many NSPs and then offer to customers the option of NaaS provided by multiple different NSPs or as an integrated option from the cloud exchange provider, e.g., using a customer portal or service APIs. The cloud exchange provider can publish information about the NaaS provided by the different NSPs, e.g., in a customer portal. The information may include pricing information, actual performance information obtained by the cloud exchange provider (e.g., by periodic testing of NSP performance), SLA compliance information, latency information, quality information, benchmarking, etc. The customer can then select a NaaS provider from among the multiple different NSPs that best fits the customer's needs.

Providing Network as a Service (NaaS) in this manner enables NSPs to make inter-metro connectivity services available to buyers via the cloud exchange. The techniques described herein may provide enterprise customers that deploy in more than one metro with a dynamic, easy, on-demand method of procuring inter-metro network connections.

Figure 8:
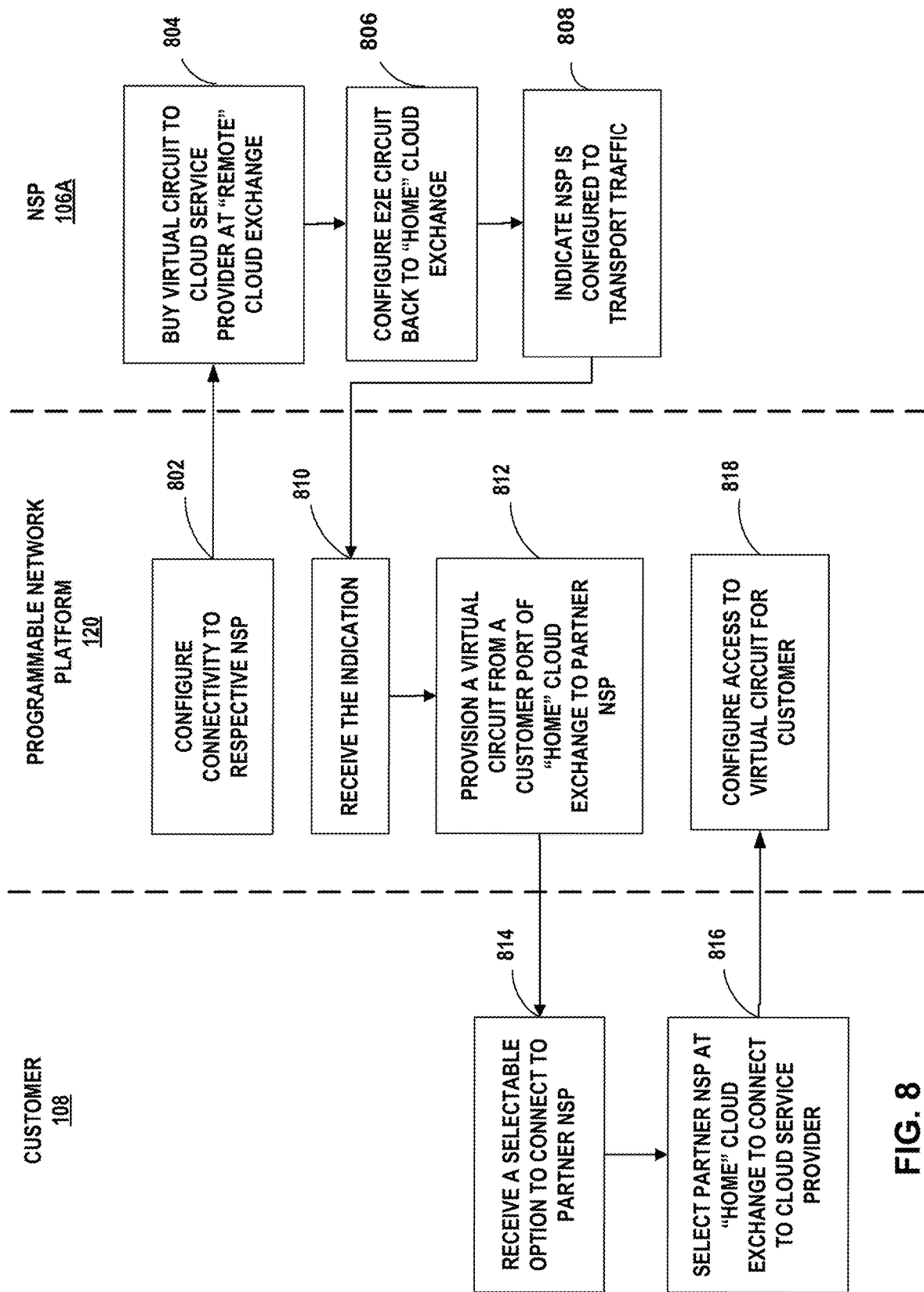
FIG. 8 is an example flowchart illustrating an ordering method for cloud exchange ports, in accordance with the techniques of this disclosure.

FIG. 8 is an example flowchart illustrating an ordering method for cloud exchange ports, in accordance with the techniques of this disclosure. FIG. 8 is described with respect to customer 108, PNP 120, and partner NSP 106A of FIG. 1. FIG. 8 is also described with respect to FIG. 5. Customer 108 from a "home" cloud exchange (e.g., "home" cloud exchange 504A of FIGS. 5A-5B) may desire to connect to cloud service providers or a remote customer network of a different metro via a connection provided by partner NSP 106A.

The programmable network platform 120 of the "home" cloud exchange may configure connectivity to partner NSP 106A to connect with cloud service providers of a "remote" cloud exchange of a different metro via partner NSP 106A (802).

NSP 106A may purchase a virtual circuit (e.g., virtual circuit 512B of FIG. 5) to a cloud service provider of a "remote" cloud exchange of a metro that is different than a metro of customer 108 (804). NSP 106A may then configure an end-to-end circuit (e.g., 514 of FIG. 5) back to the "home" cloud exchange (806) such that NSP 106A may provide inter-metro cloud service connectivity. NSP 106A may indicate that the NSP is configured to exchange traffic from the customer of NSP 106A and the cloud service provider of a different metro (808). For example, the indication may include a service key to the "home" cloud exchange.

PNP 120 may receive the indication that NSP 106A is configured to transport traffic between customer 108 of one metro to a cloud service provider of a different metro (810). PNP 120 may then provision a virtual circuit from a customer port of a cloud exchange to partner NSP 106A (812).

On the "home" cloud exchange, customer 108 may receive a selectable option to connect to NSP 106A (814). In other words, programmable network platform 120 of a "home" cloud exchange may present to customer 108 a list of available NSPs to connect to a cloud service provider of a different metro. Customer 108 may then select NSP 106A to purchase the virtual circuit connected to NSP 106A such that customer 108 may inter-connect to the cloud service provider of a different metro (816). In response, PNP 120 may configure, for the customer, access to the cloud service provider via the virtual circuit to NSP 106A (818).

Figure 9A:
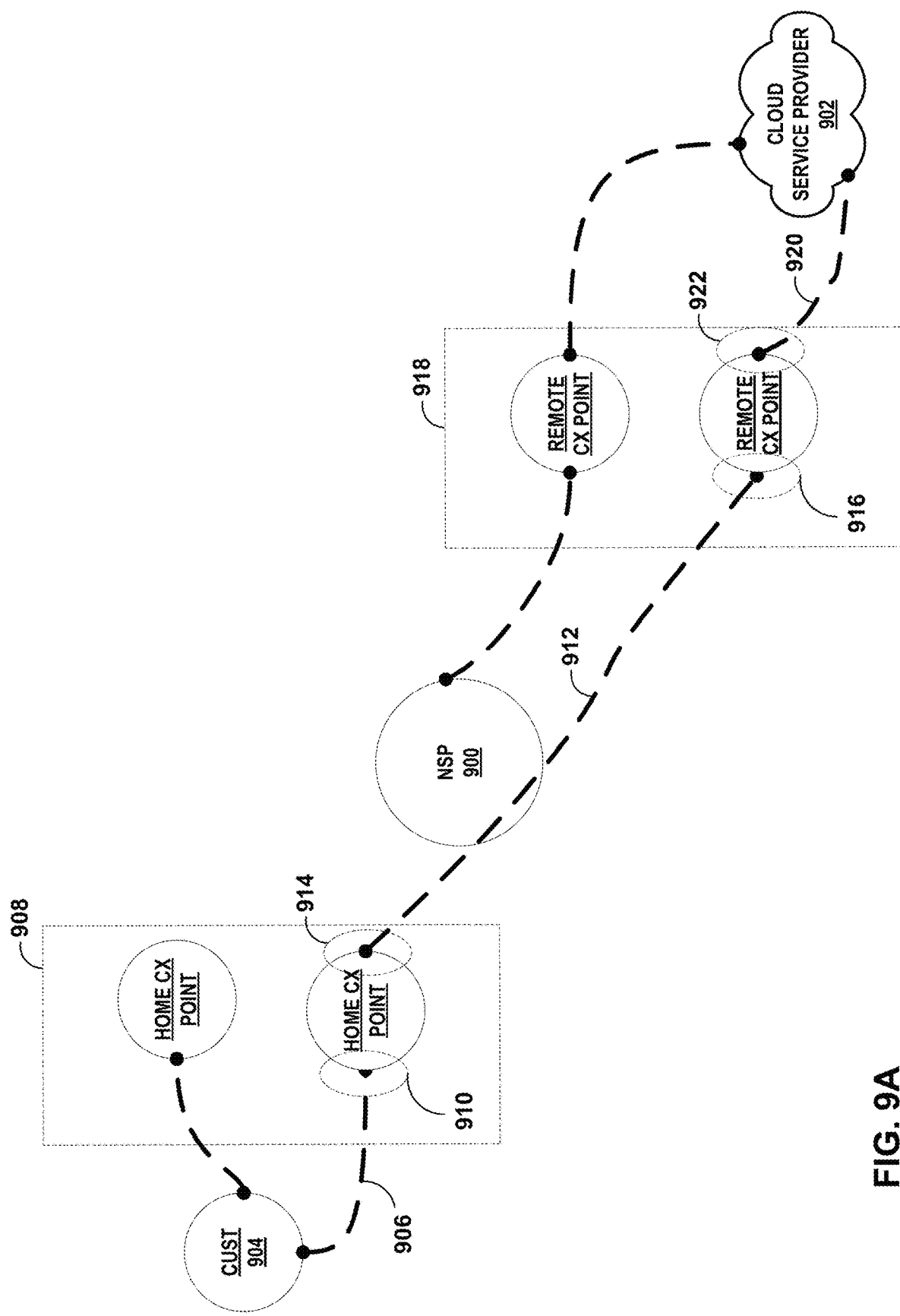
FIGS. 9A-9C are block diagrams illustrating further details of example test setup connections to cloud service providers in accordance with one or more techniques of the present disclosure.
Figure 9B:
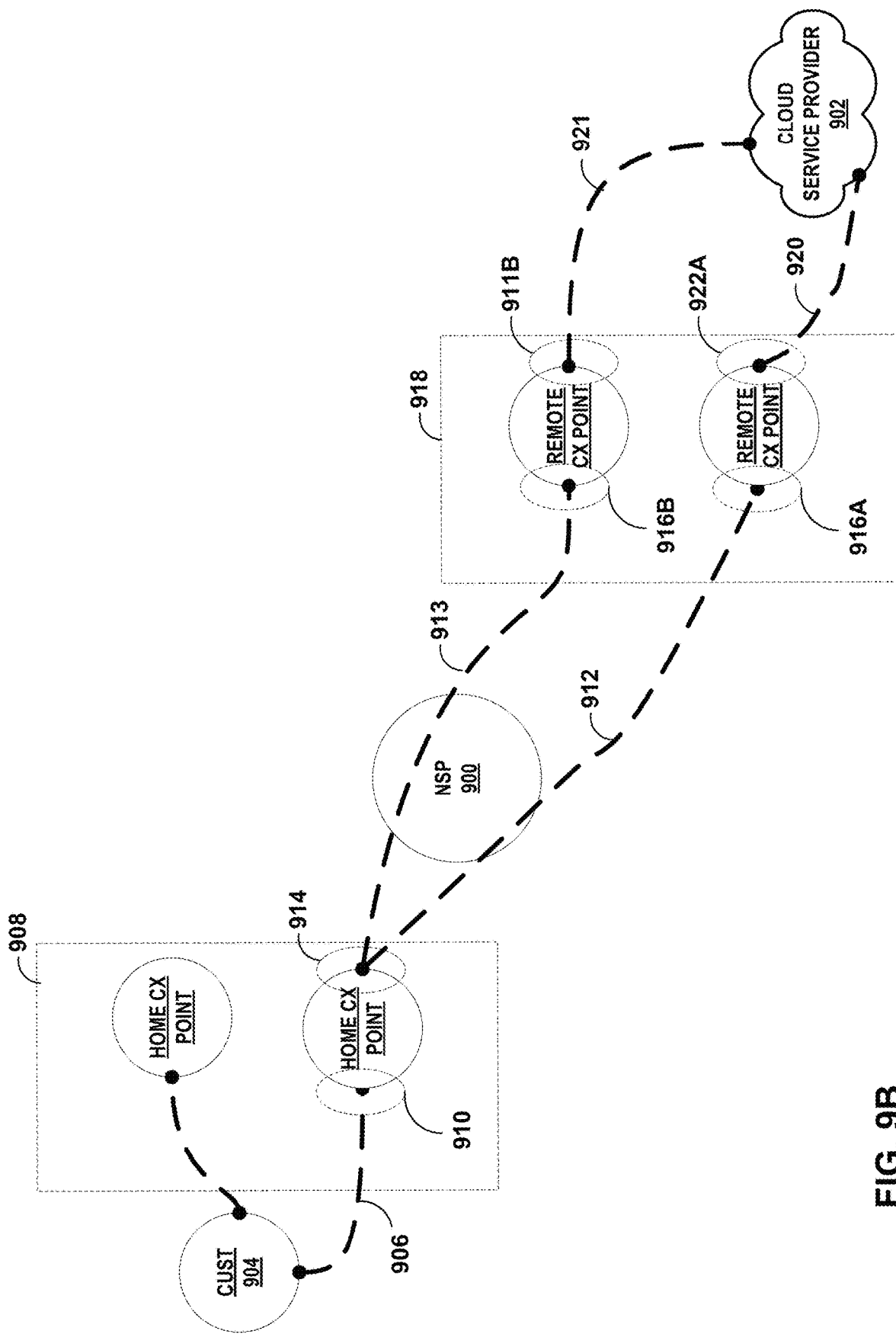
Figure 9C:
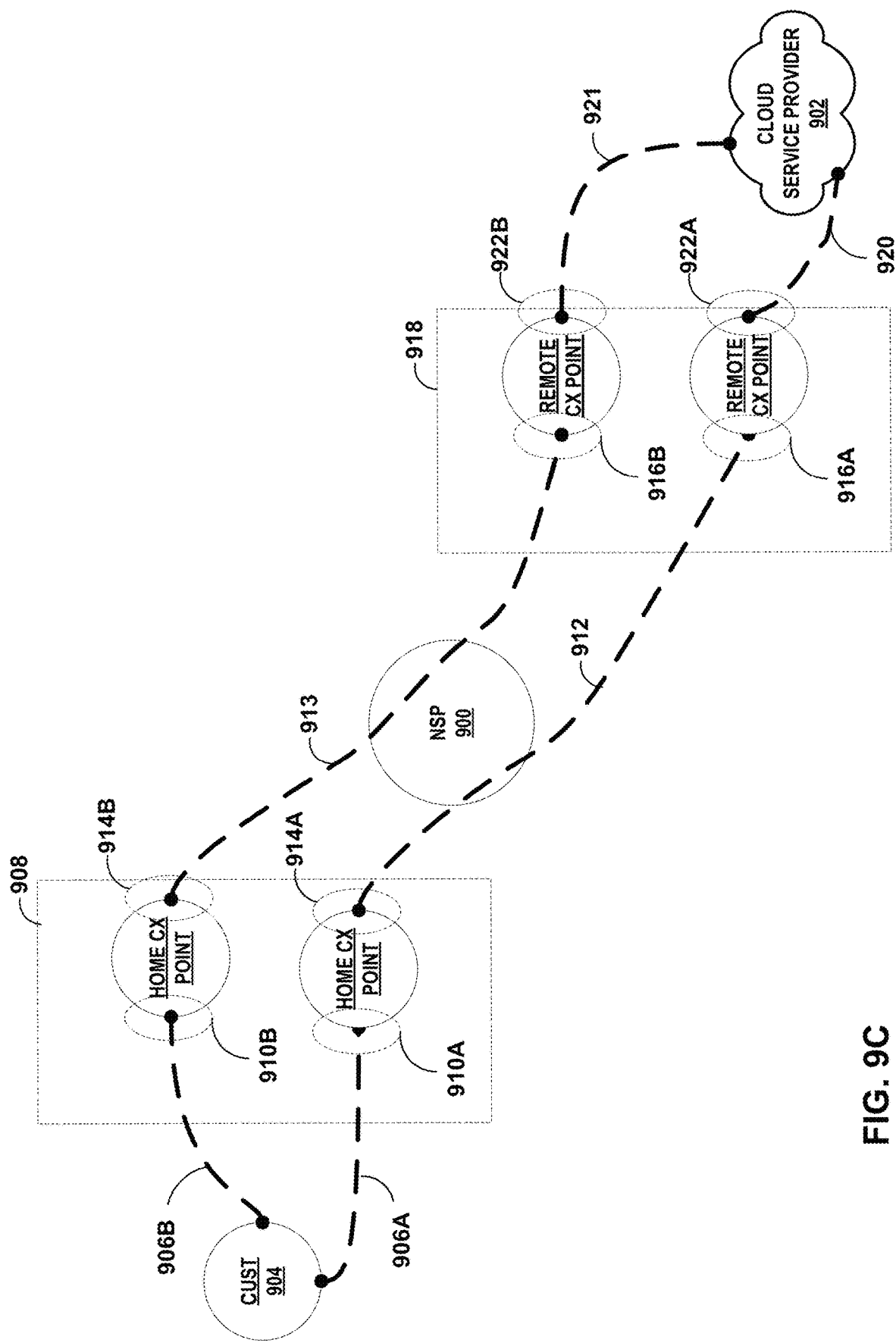

FIGS. 9A-9C are block diagrams illustrating further details of example test setup connections to cloud service providers in accordance with one or more techniques of the present disclosure. As described above, a cloud exchange provider may perform the test scenarios illustrated in FIGS. 9A-9C. In FIGS. 9A-9C, the network service provider 900 is a seller to the customer on the "home" cloud exchange 908 providing full connectivity to cloud service provider 902.

FIG. 9A may represent a test scenario of a single connection to a cloud service provider. In the example of FIG. 9A, a customer service center 904 may include a customer rack and equipment that provides customer termination on L2 or L3. The cloud exchange may test connection 906 at the "home" cloud exchange 908. This includes testing the connections between the customer equipment and customer cloud exchange port 910 providing a local cloud service provider.

When cloud connectivity is purchased from the network service provider (NSP) 900, the cloud exchange may test connection 912 between the "home" cloud exchange 906 and the NSP 900. For example, the cloud exchange may test connection 912 between NSP cloud exchange port 914 (e.g., operating in QinQ standard) of a "home" cloud exchange and the "remote" cloud exchange port 916 of a "remote" cloud exchange 918.

Testing may also occur for connection 920 between the "remote" cloud exchange ports 922 providing local cloud service provider connectivity to cloud service provider 902.

FIG. 9B may represent another test scenario of a plurality of singular connections to a cloud service provider. In the example of FIG. 9B, a customer service center 904 may include a customer rack and equipment that provides customer termination on L2 or L3. The cloud exchange may test connection 906 at the "home" cloud exchange 908. This includes testing the singular connection between customer equipment 904 and customer cloud exchange port 910 providing local cloud service provider.

When cloud connectivity is purchased from the network service provider (NSP) 900, the cloud exchange may test connections 912 and 913 between the "home" cloud exchange 908 and the NSP 900. For example, connection 912 between NSP cloud exchange port 914 (e.g., operating in QinQ standard) of a "home" cloud exchange 908 and "remote" cloud exchange port 916A of a "remote" cloud exchange 918 is tested. Additionally, connection 913 between the same NSP cloud exchange port 914 of the "home" cloud exchange 908 and a different "remote" cloud exchange port 916B of the "remote" cloud exchange 918 is tested.

In the example of FIG. 9B, testing may also occur for connections 920 and 921 between the "remote" cloud exchange ports 922A, 922B providing local cloud service provider connectivity to cloud service provider 902, respectively.

FIG. 9C may represent a redundant test scenario of connections to a cloud service provider. In the example of FIG. 9C, a customer service center 904 may include a customer rack and equipment that provides customer termination on L2 or L3. The cloud exchange may test connections at "home" cloud exchange 908 are tested. This includes testing connections 906A, 906B between customer equipment 904 and different customer cloud exchange ports 910A, 910B providing local cloud service provider connectivity, respectively.

When cloud connectivity is purchased from network service provider (NSP) 900, the cloud exchange may test connections 912, 913 between "home" cloud exchange 908 and NSP 900. For example, connection 912 between NSP cloud exchange port 914A (e.g., operating in QinQ standard) of a "home" cloud exchange 908 and "remote" cloud exchange port 916A of a "remote" cloud exchange 918 is tested. Additionally, connection 913 between a different NSP cloud exchange port 914B of the "home" cloud exchange 908 and a different "remote" cloud exchange port 916B of the "remote" cloud exchange 918 is tested.

In the example of FIG. 9C, testing may also occur for connections 920 and 921 between the "remote" cloud exchange ports 922A, 922B providing local cloud service provider connectivity to cloud service provider 902, respectively.

Figure 10:
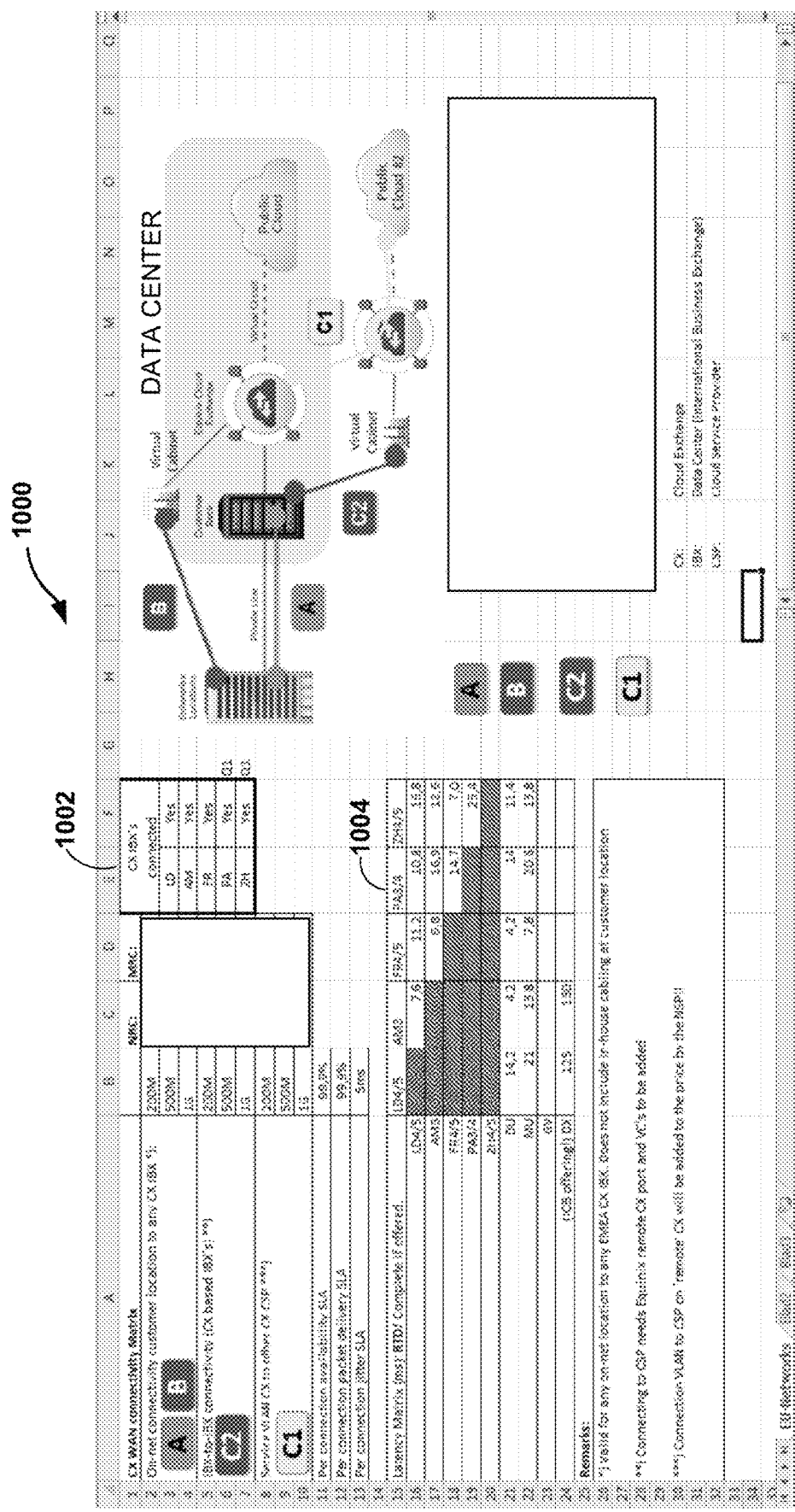
FIG. 10 is an example illustration of a template for NSPs in accordance with one or more techniques of the present disclosure.

FIG. 10 is an example illustration of a template provided by the cloud exchange to NSPs for completion, in accordance with one or more techniques of the present disclosure. In the example of FIG. 10, template 1000 may represent a template including standard pricing, latencies between markets addressed for the connection to a respective network service provider, service level agreements, and routes. Template 1000 of FIG. 10 may be an example template provided by the cloud exchange to NSPs for completion, and returned by the NSP to the cloud exchange provider such that the NSP may be configured to provide inter-metro connectivity to cloud service providers of different metropolitan areas. For example, the template may include various pricing 1002 corresponding to various connections to the NSP. For example, the pricing may be dependent upon the cross connection of the "home"/"buyer" data center side, a connection to a virtual circuit, extra cross connections at the "home"/"buyer" data center side or the "remote"/"seller" data center side, and a virtual local area network connection to the cloud service provider at the remote end of the network service provider. The template 1000 may further include latency information for the NSP 1004. The cloud exchange provider can make the information collected from the NSP via the template available to potential customers in a marketplace catalog, for examples.

The techniques of this disclosure provide customers the ability to discover, contract, and provision for network connectivity services (NaaS) in a more streamlined way, via a cloud exchange, providing for easier connectivity between data centers in remote metro locations. Using template 1000, customers can see which NSPs are available and can see the prices of the NaaS offerings and latency attributes for multiple NSPs, all in one view. This approach can dramatically reduce the time to obtaining the inter-metro connectivity service (e.g., from months to hours), because all the contract negotiation, testing, setup is already been performed in advance by the cloud exchange provider. The cloud exchange provider can negotiate contracts with NSPs for offering NaaS connectivity for common increments (e.g., 200 MB, 100 MB and 1 GB speeds), allowing customers to easily compare between offerings from different NSPs for the network connectivity service.

Figure 11:
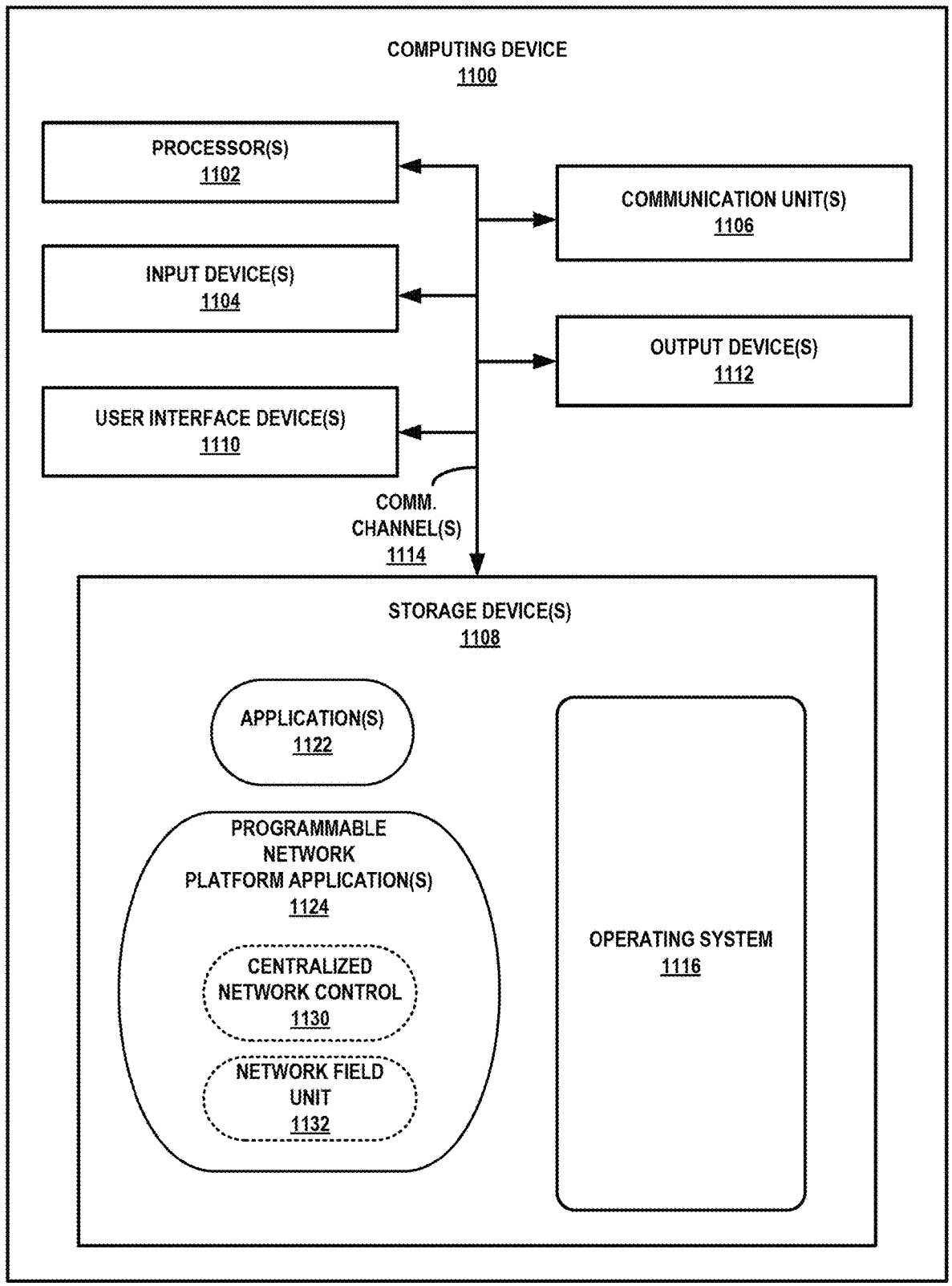
FIG. 11 is a block diagram illustrating further details of one example of a computing device that operates in accordance with one or more techniques of the present disclosure.

FIG. 11 is a block diagram illustrating further details of one example of a computing device that operates in accordance with one or more techniques of the present disclosure. FIG. 11 may illustrate a particular example of a server or other computing device 1100 that includes one or more processor(s) 1102 for executing any one or more of the programmable network platform components (e.g., CNC, NFU, etc.), or any other system, application, or module described herein. Other examples of computing device 1100 may be used in other instances. Although shown in FIG. 10 as a stand-alone computing device 1100 for purposes of example, a computing device may be any component or system that includes one or more processors or other suitable computing environment for executing software instructions and, for example, need not necessarily include one or more elements shown in FIG. 11 (e.g., communication units 1106; and in some examples, components such as storage device (s) 1108 may not be co-located or in the same chassis as other components).

As shown in the specific example of FIG. 11, computing device 1100 includes one or more processors 1102, one or more input devices 1104, one or more communication units 1106, one or more output devices 1112, one or more storage devices 1108, and user interface (UI) device 1110. Computing device 1100, in one example, further includes one or more applications 1122, programmable network platform application(s) 1124, and operating system 1116 that are executable by computing device 1100. Each of components 1102, 1104, 1106, 1108, 1110, and 1112 are coupled (physically, communicatively, and/or operatively) for inter-component communications. In some examples, communication channels 1114 may include a system bus, a network connection, an inter-process communication data structure, or any other method for communicating data. As one example, components 1102, 1104, 1106, 1108, 1110, and 1112 may be coupled by one or more communication channels 1114.

Processors 1102, in one example, are configured to implement functionality and/or process instructions for execution within computing device 1100. For example, processors 1102 may be capable of processing instructions stored in storage device 1108. Examples of processors 1102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1108 may be configured to store information within computing device 1100 during operation. Storage device 1108, in some examples, is described as a computer-readable storage medium. In some examples, storage device 1108 is a temporary memory, meaning that a primary purpose of storage device 1108 is not long-term storage. Storage device 1108, in some examples, is described as a volatile memory, meaning that storage device 1108 does not maintain stored contents when the computer is turned off. Examples of volatile memories include random access memories (RAM), dynamic random access memories (DRAM), static random access memories (SRAM), and other forms of volatile memories known in the art. In some examples, storage device 1108 is used to store program instructions for execution by processors 1102. Storage device 1108, in one example, is used by software or applications running on computing device 1100 to temporarily store information during program execution.

Storage devices 1108, in some examples, also include one or more computer-readable storage media. Storage devices 1108 may be configured to store larger amounts of information than volatile memory. Storage devices 1108 may further be configured for long-term storage of information. In some examples, storage devices 1108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1100, in some examples, also includes one or more communication units 1106. Computing device 1100, in one example, utilizes communication units 1106 to communicate with external devices via one or more networks, such as one or more wired/wireless/mobile networks. Communication units 1106 may include a network interface card, such as an Ethernet card, an optical transceiver, a radio frequency transceiver, or any other type of device that can send and receive information. In some examples, computing device 1100 uses communication unit 1106 to communicate with an external device.

Computing device 1100, in one example, also includes one or more user interface devices 1110. User interface devices 1110, in some examples, are configured to receive input from a user through tactile, audio, or video feedback. Examples of user interface devices(s) 1110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1112 may also be included in computing device 1100. Output device 1112, in some examples, is configured to provide output to a user using tactile, audio, or video stimuli. Output device 1112, in one example, includes a presence-sensitive display, a sound card, a video graphics adapter card, or any other type of device for converting a signal into an appropriate form understandable to humans or machines. Additional examples of output device 1112 include a speaker, a cathode ray tube (CRT) monitor, a liquid crystal display (LCD), or any other type of device that can generate intelligible output to a user.

Computing device 1100 may include operating system 1116. Operating system 1116, in some examples, controls the operation of components of computing device 1100. For example, operating system 1116, in one example, facilitates the communication of one or more applications 1122 and programmable network platform application(s) 1124 with processors 1102, communication unit 1106, storage device 1108, input device 1104, user interface devices 1110, and output device 1112.

Application 1122 and programmable network platform application(s) 1124 may also include program instructions and/or data that are executable by computing device 1100. Example programmable network platform application(s) 1124 executable by computing device 1100 may include any one or more of centralized network control application 1130 ("CNC 1130") and network field unit application 1132 ("NFU 1132"), each illustrated with dashed lines to indicate that these may or may not be executable by any given example of computing device 1100.

Centralized network control 1130 may include instructions for causing computing device 1100 to perform one or more of the operations and actions described in the present disclosure with respect to centralized network control. As one example, CNC 1130 may include instructions that cause computing device 1100 to establish, de-install and manage interconnections with multiple, different cloud service providers and/or customer networks of a different metropolitan area utilizing respective network service providers participating in the cloud exchange in an automated and seamless manner.

Network Field Unit 1132 may include instructions for causing computing device 1100 to perform one or more of the operations and actions described in the present disclosure with respect to network field units. As one example, NFU 1132 may include instructions that cause computing device 1100 to receive requests or instructions from a CNC executing on another server, e.g., in a different geographic location such as a different data center, to configure network infrastructure of a cloud exchange point in order to provision one or more services.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules. Various embodiments have been described. These and other embodiments are within the scope of the following examples.

What is claimed is:

1. A method comprising:
   receiving, by a customer device and from a programmable network platform for a cloud based services exchange point of a first metropolitan area and a cloud based services exchange point of a second metropolitan area, one or more selectable options to connect to a network service provider (NSP) configured to transport traffic from the first metropolitan area to the second metropolitan area, wherein a first virtual circuit is provisioned by the programmable network platform from a port of a cloud-based services exchange point of the first metropolitan area to the NSP, and a second virtual circuit is provisioned by the programmable network platform from a port of a cloud-based services exchange point of the second metropolitan area to the NSP;
   selecting, by the customer device and from the programmable network platform, the NSP to connect the customer device of the first metropolitan area to one or more cloud service provider networks of the second metropolitan area; and
   responsive to selecting the NSP, accessing, by the customer device of the first metropolitan area, the one or more cloud services of the second metropolitan area via the NSP and the first and second virtual circuits provisioned by the programmable network platform to interconnect the NSP to the first metropolitan area and the second metropolitan area.

2. The method of claim 1, wherein selecting the NSP comprises selecting the first virtual circuit and the second virtual circuit to connect the customer device of the first metropolitan area to the one or more cloud service provider networks of the second metropolitan area network via the NSP and the first and second virtual circuits.

3. The method of claim 1,
   wherein selecting the NSP comprises selecting the NSP based on at least one of bandwidth, service-level agreements, quality, performance, or price of the NSP.

4. The method of claim 1, wherein the first and second virtual circuits are pre-provisioned by the programmable network platform prior to selecting the NSP.

5. A device comprising:
   at least one computer processor; and
   a memory comprising instructions that when executed by the at least one computer processor cause the at least one computer processor to:
   receive, from a programmable network platform for a cloud based services exchange point of a first metropolitan area including the device and a cloud based services exchange point of a second metropolitan area, one or more selectable options to connect to a network service provider (NSP) configured to transport traffic from the first metropolitan area to the second metropolitan area, wherein a first virtual circuit is provisioned by the programmable network platform from a port of a cloud-based services exchange point of the first metropolitan area to the NSP, and a second virtual circuit is provisioned by the programmable network platform from a port of a cloud-based services exchange point of the second metropolitan area to the NSP;
   select, from the programmable network platform, the NSP to connect the device of the first metropolitan area to one or more cloud service provider networks of the second metropolitan area; and
   responsive to selecting the NSP, access the one or more cloud services of the second metropolitan area via the NSP and the first and second virtual circuits provisioned by the programmable network platform to interconnect the NSP to the first metropolitan area and the second metropolitan area.

6. The device of claim 5, wherein, to select the NSP, the instructions cause the at least one computer processor to:
   select the first virtual circuit and the second virtual circuit to connect the device of the first metropolitan area to the one or more cloud service provider networks of the second metropolitan area network via the NSP and the first and second virtual circuits.

7. The device of claim 5, wherein, to select the NSP, the instructions cause the at least one computer processor to:
   select the NSP based on at least one of bandwidth, service-level agreements, quality, performance, or price of the NSP.

8. The device of claim 5, wherein the first and second virtual circuits are pre-provisioned by the programmable network platform prior to selecting the NSP.

9. A non-transitory computer-readable storage medium encoded with instructions that, when executed, cause at least one processor of a device to:
   receive, from a programmable network platform for a cloud based services exchange point of a first metropolitan area including the device and a cloud based services exchange point of a second metropolitan area, one or more selectable options to connect to a network service provider (NSP) configured to transport traffic from the first metropolitan area to the second metropolitan area, wherein a first virtual circuit is provisioned by the programmable network platform from a port of a cloud-based services exchange point of the first metropolitan area to the NSP, and a second virtual circuit is provisioned by the programmable network platform from a port of a cloud-based services exchange point of the second metropolitan area to the NSP;
   select, from the programmable network platform, the NSP to connect the device of the first metropolitan area to one or more cloud service provider networks of the second metropolitan area; and
   responsive to selecting the NSP, access the one or more cloud services of the second metropolitan area via the NSP and the first and second virtual circuits provisioned by the programmable network platform to interconnect the NSP to the first metropolitan area and the second metropolitan area.

10. The non-transitory computer-readable storage medium of claim 9, wherein, to select the NSP, the instructions cause the at least one computer processor to:
    select the first virtual circuit and the second virtual circuit to connect the device of the first metropolitan area to the one or more cloud service provider networks of the second metropolitan area network via the NSP and the first and second virtual circuits.

11. The non-transitory computer-readable storage medium of claim 9, wherein, to select the NSP, the instructions cause the at least one computer processor to:
    select the NSP based on at least one of bandwidth, service-level agreements, quality, performance, and price of the NSP.

12. The non-transitory computer-readable storage medium of claim 9, wherein the first and second virtual circuits are pre-provisioned by the programmable network platform prior to selecting the NSP.

* * * * *